(12) United States Patent
Kramer

(10) Patent No.: US 7,163,311 B2
(45) Date of Patent: Jan. 16, 2007

(54) FOODWARE HAVING VISUAL SENSORY STIMULATING OR SENSING MEANS

(76) Inventor: James F. Kramer, 141 Welllesley Cres. #305, Redwood City, CA (US) 64062

(*) Notice: Subject to any disclaimer, the term of this patent is extended or adjusted under 35 U.S.C. 154(b) by 0 days.

(21) Appl. No.: 10/904,103

(22) Filed: Oct. 22, 2004

(65) Prior Publication Data

US 2006/0087831 A1    Apr. 27, 2006

(51) Int. Cl.
A47G 19/02 (2006.01)
(52) U.S. Cl. ............... 362/154; 362/101; 362/109; 362/157; 220/574; 220/574.3
(58) Field of Classification Search ........... 362/154, 362/101, 109, 23, 29, 30, 84, 157, 800; 220/574, 220/574.3; 446/175, 219; 239/16–18; 40/442, 40/452, 421, 427, 444, 446, 448, 541, 542; 428/13
See application file for complete search history.

(56) References Cited

U.S. PATENT DOCUMENTS

| | | | | |
|---|---|---|---|---|
| 2,114,460 A | * | 4/1938 | Ziegler | 362/154 |
| 2,224,319 A | * | 12/1940 | Schroyer | 362/101 |
| 2,663,866 A | * | 12/1953 | Simpson | 340/689 |
| 3,370,163 A | * | 2/1968 | Dudley | 362/119 |
| 3,510,643 A | * | 5/1970 | File | 362/26 |
| 3,705,982 A | * | 12/1972 | Smolinski | 362/154 |
| 3,839,793 A | * | 10/1974 | Crapio | 30/123 |
| 3,878,386 A | * | 4/1975 | Douglas | 362/101 |
| 4,034,213 A | * | 7/1977 | Norris | 362/200 |
| 4,207,673 A | * | 6/1980 | DiGirolamo et al. | 30/142 |
| 4,344,113 A | * | 8/1982 | Ditto et al. | 362/101 |
| 4,390,928 A | * | 6/1983 | Runge | 362/101 |
| 4,803,604 A | * | 2/1989 | Nichols et al. | 362/154 |
| 4,914,819 A | * | 4/1990 | Ash | 30/147 |
| 4,922,355 A | * | 5/1990 | Dietz et al. | 362/101 |
| 5,023,761 A | * | 6/1991 | de Lange | 362/120 |
| 5,047,267 A | * | 9/1991 | Pantaleo et al. | 428/13 |
| 5,075,970 A | * | 12/1991 | Albert | 30/123 |
| 5,119,279 A | * | 6/1992 | Makowsky | 362/101 |
| 5,189,793 A | * | 3/1993 | Ratzon et al. | 30/123 |
| 5,269,717 A | * | 12/1993 | Tardif | 446/132 |
| 5,339,548 A | * | 8/1994 | Russell | 362/101 |
| 5,355,289 A | * | 10/1994 | Krenn | 362/253 |
| 5,430,628 A | * | 7/1995 | Saunders | 362/253 |
| 5,485,355 A | | 1/1996 | Voskoboinik et al. | 362/84 |
| 5,553,735 A | * | 9/1996 | Kimura | 362/101 |
| 5,575,553 A | | 11/1996 | Tipton | 362/101 |

(Continued)

OTHER PUBLICATIONS

Livewire Enterprises, Product Name: "LiveWire," information from website: www.livewireent.com/gallery-parties.shtml, unknown initial posting date.
Matthew Crowley, "Inventions: Glitter Gulp," Las Vegas Review Journal, Feb. 10, 2003, website: www.reviewjournal.com/lvrj_home/2003/Feb.-10-Mon-2003/business/20583098.html.

(Continued)

Primary Examiner—Sandra O'Shea
Assistant Examiner—Ismael Negron

(57) ABSTRACT

Active foodware comprises at least a plate unit that provides visual stimuli by having a power source and a visual sensory stimulating component to provide light emanating from the plate. Other devices can provide auditory and haptic stimuli. The plate unit can be a single component where the device and circuitry are all contained in the unit and protected from water or can be two components an upper translucent plate and an underplate comprising the devices and circuitry for directing light through the upper plate.

51 Claims, 27 Drawing Sheets

U.S. PATENT DOCUMENTS

| | | | | |
|---|---|---|---|---|
| 5,678,925 | A | | 10/1997 | Garmaise et al. ............ 374/157 |
| 5,966,814 | A | * | 10/1999 | Lin .............................. 30/123 |
| 5,969,606 | A | | 10/1999 | Reber et al. ................. 340/540 |
| 6,129,292 | A | * | 10/2000 | Leung et al. .................. 239/33 |
| 6,140,932 | A | * | 10/2000 | Frank et al. ................. 340/692 |
| 6,152,575 | A | * | 11/2000 | Montanino .................. 362/251 |
| 6,163,248 | A | | 12/2000 | Paek et al. ................... 340/321 |
| 6,213,616 | B1 | * | 4/2001 | Chien ........................... 362/84 |
| 6,254,247 | B1 | | 7/2001 | Carson ........................ 362/101 |
| 6,335,691 | B1 | * | 1/2002 | Bird ......................... 340/691.1 |
| 6,419,384 | B1 | * | 7/2002 | Lewis et al. ................. 362/562 |
| 6,443,589 | B1 | * | 9/2002 | Lee ............................. 362/101 |
| 6,464,222 | B1 | * | 10/2002 | Parker ........................ 273/236 |
| 6,511,196 | B1 | * | 1/2003 | Hoy ............................ 362/101 |
| 6,591,524 | B1 | * | 7/2003 | Lewis et al. .................. 40/324 |
| 6,793,362 | B1 | * | 9/2004 | Tai .............................. 362/101 |
| 6,865,815 | B1 | * | 3/2005 | Dunn et al. .................... 30/324 |
| 2002/0079317 | A1 | * | 6/2002 | Scott ........................... 220/574 |

OTHER PUBLICATIONS

EBIGCHINA.COM, Product Name: "Flash Ice Glass," information from website: www.ebigchina.com/ebcps/4/pd/811728.html?mode=?popup, unknown initial posting date.

COOLSTUFFCHEAP.COM, Product Name: "Lighted Barware," information from website: www.coolstuffcheap.com/lightware.html, unknown initial posting date.

SHOP.COM, Product Name: "Fiber Optic Stemmed Glass," information from website: www.shop.com/op/aprod-~fiber+optic+stemmed+glass-s66761, unknown initial posting date.

RELUCT.COM, Category: "EL Wire Light Objects," information from website: www.reluct.com/home/2004_07_25_archive.html, unknown initial posting date.

Connie Cheng and Leonardo Bonanni, Counter Intelligence-MIT Media Lab, "Intelligent Spoon," website: www.media.mit.edu/ci/projects/intelligentspoon.html, unk initial posting date.

* cited by examiner

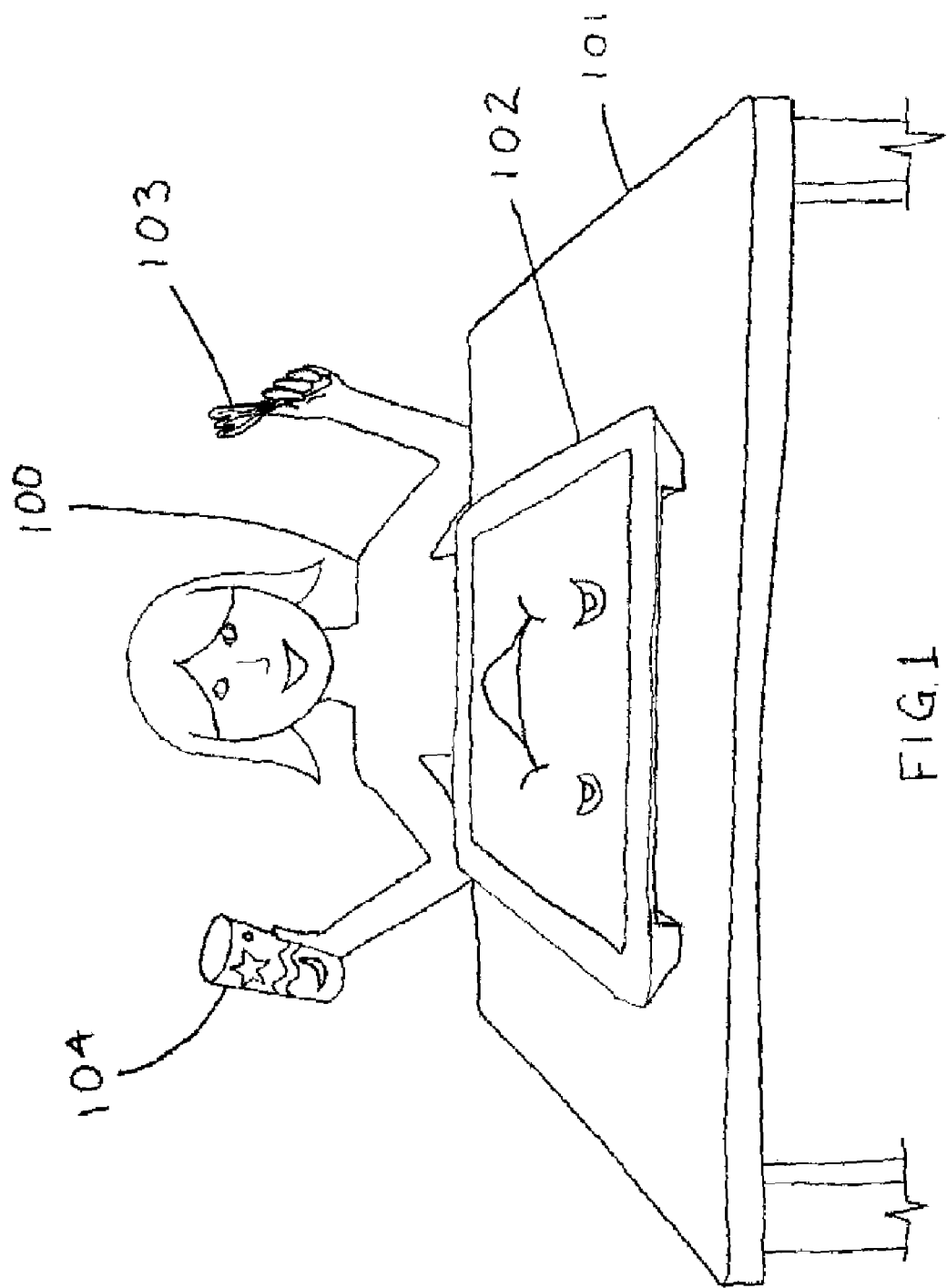

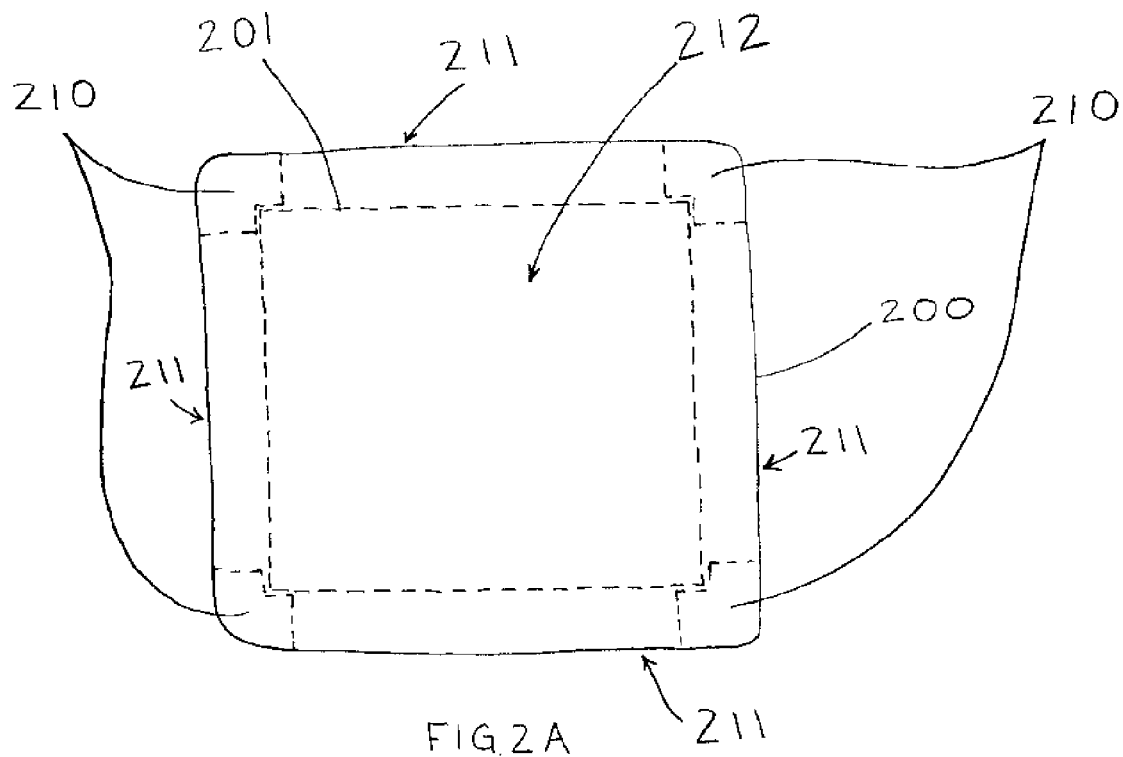
FIG. 2A
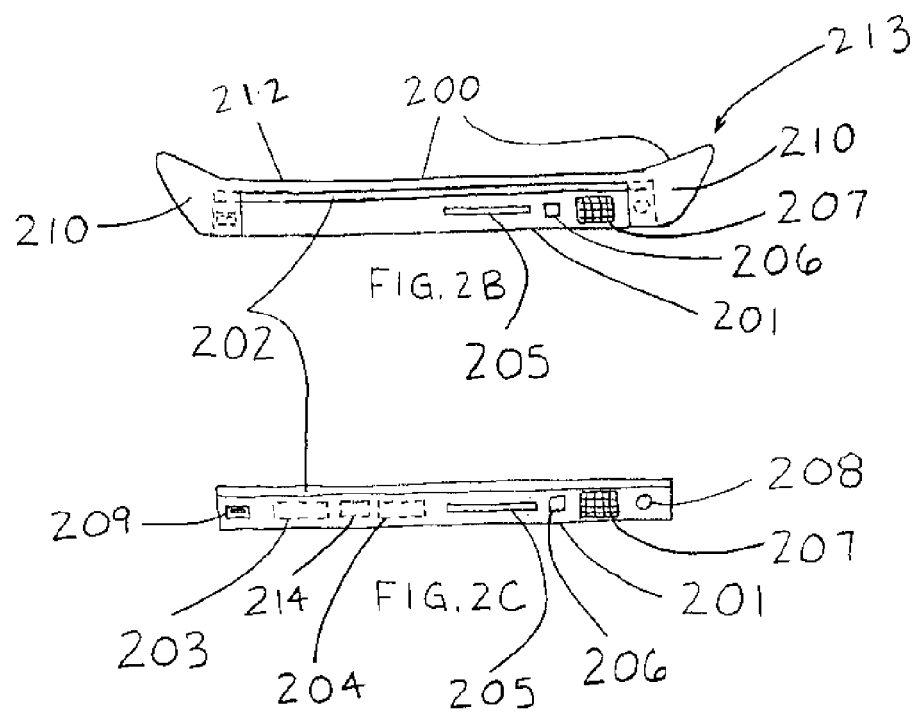
FIG. 2B
FIG. 2C

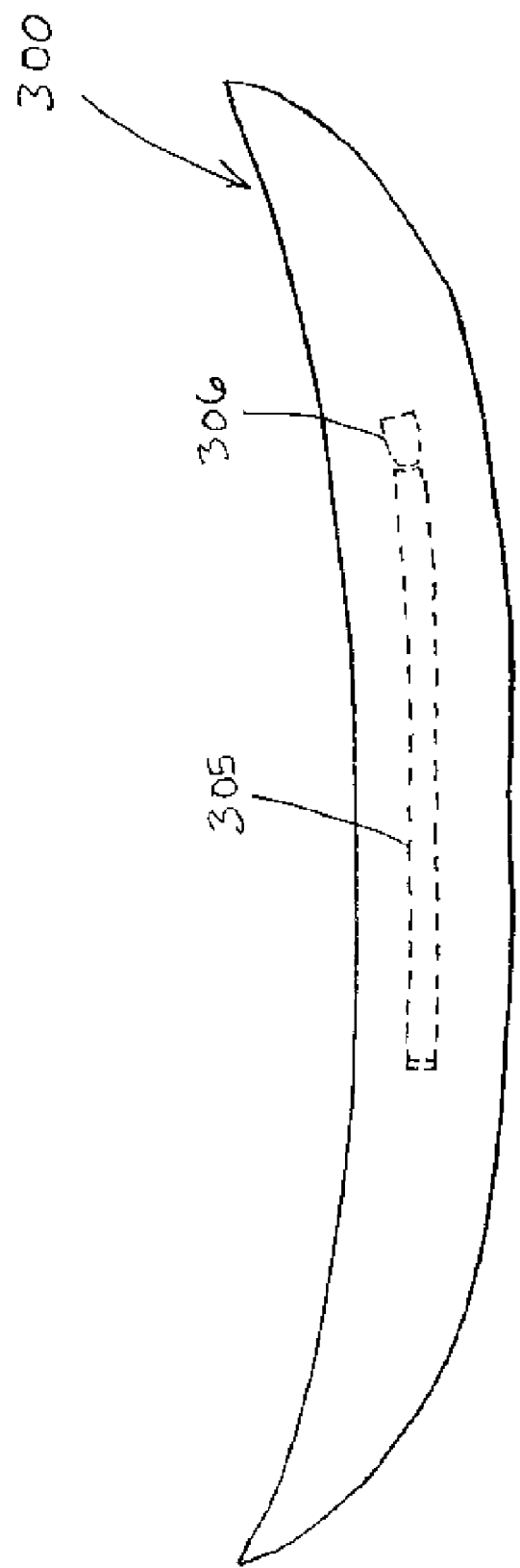

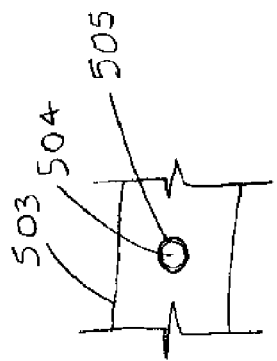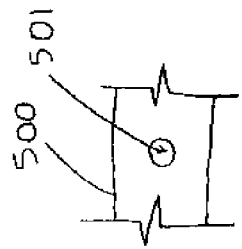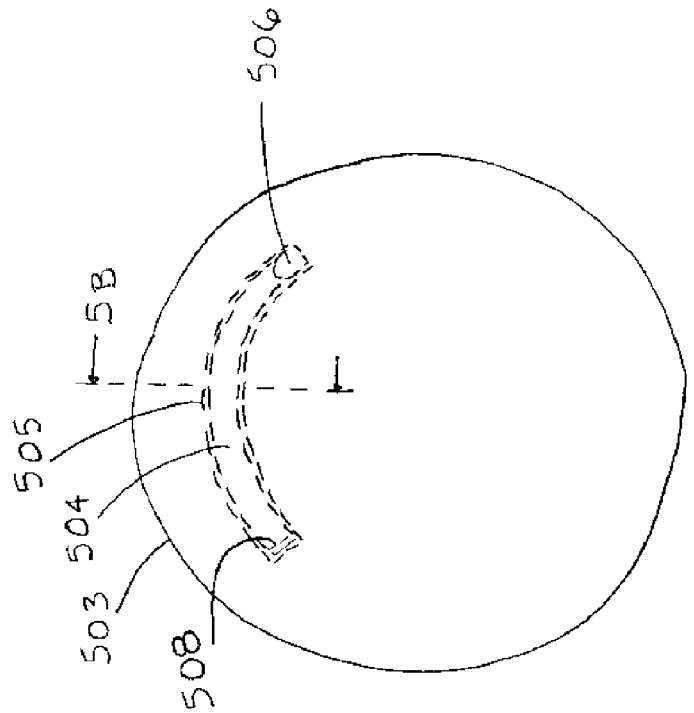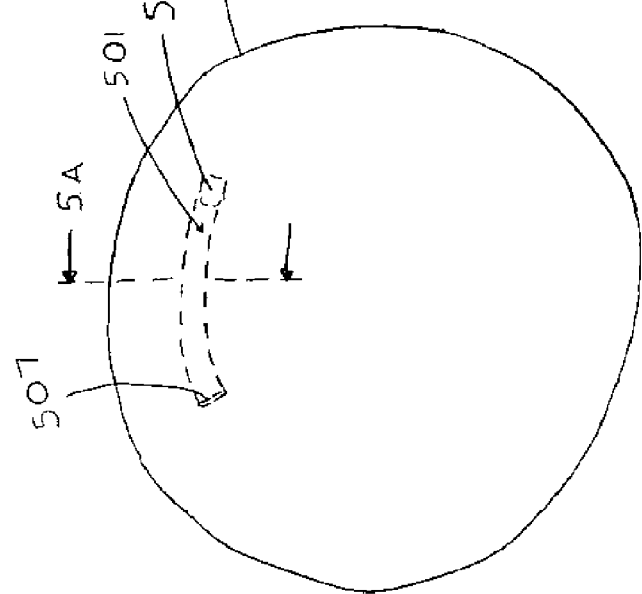

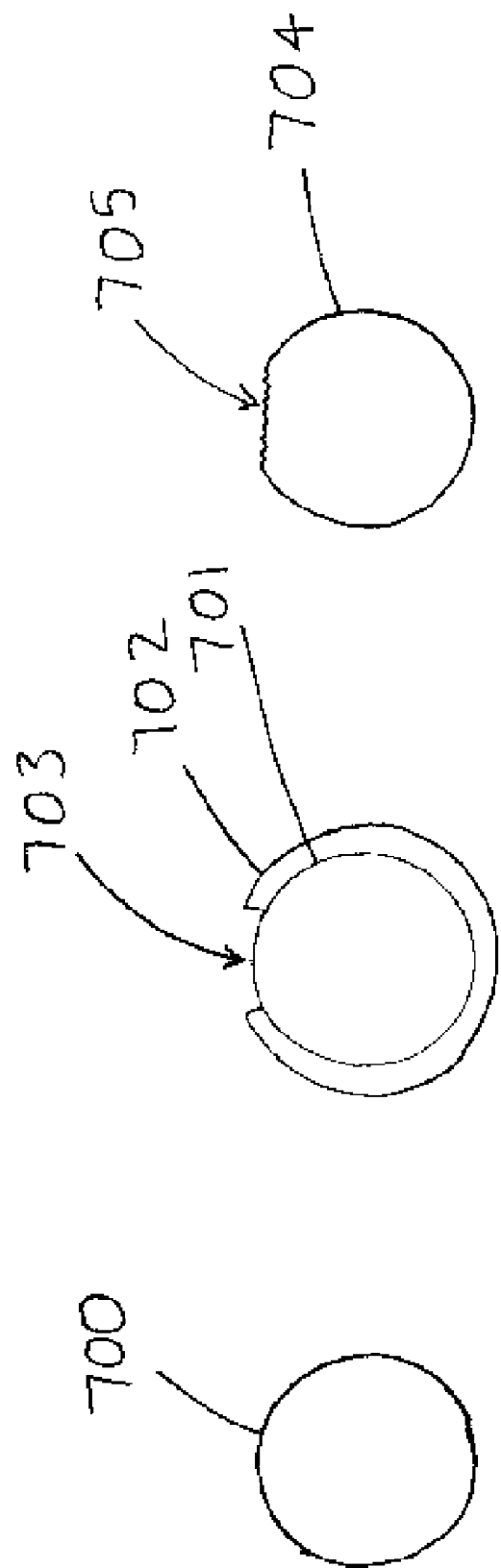

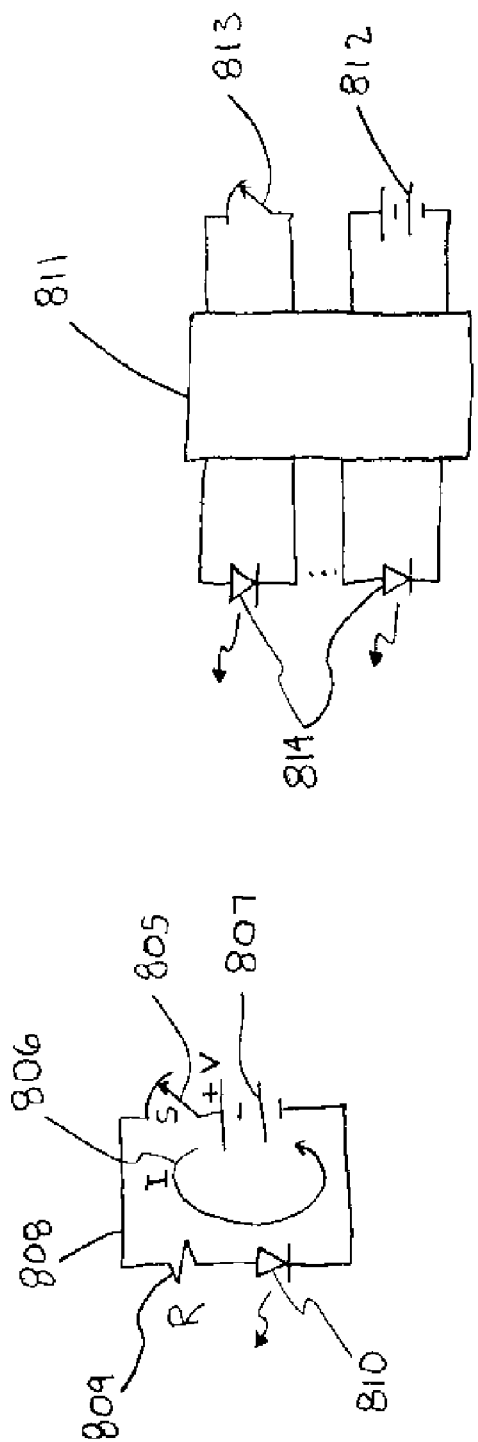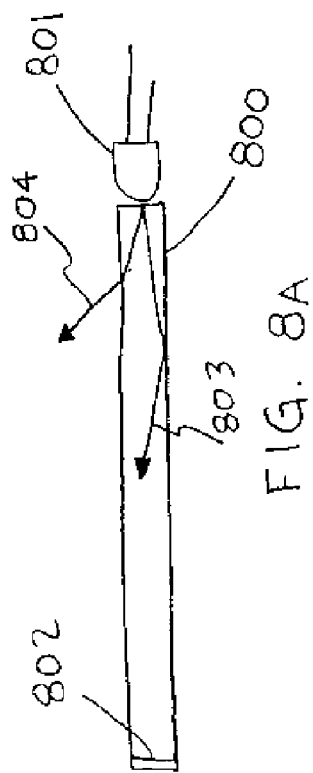
FIG. 8C
FIG. 8B
FIG. 8A

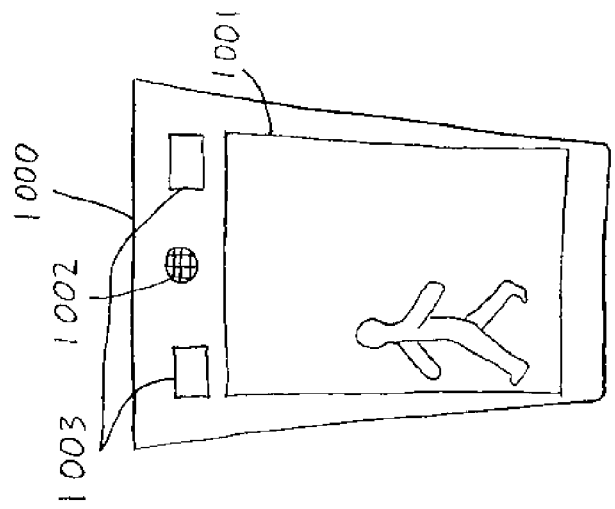
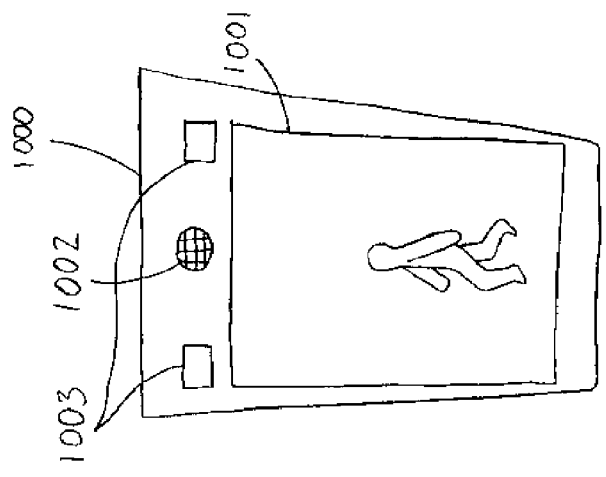
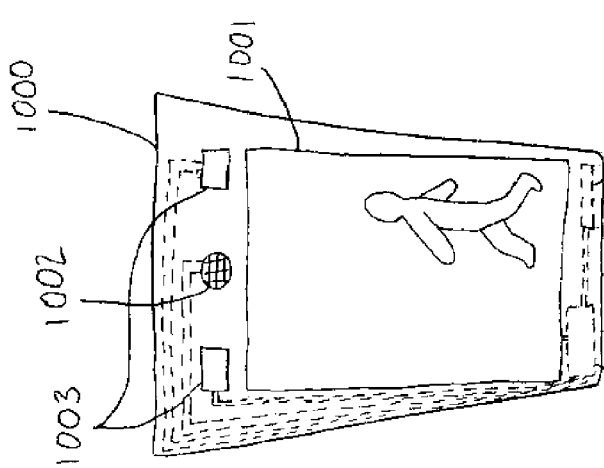
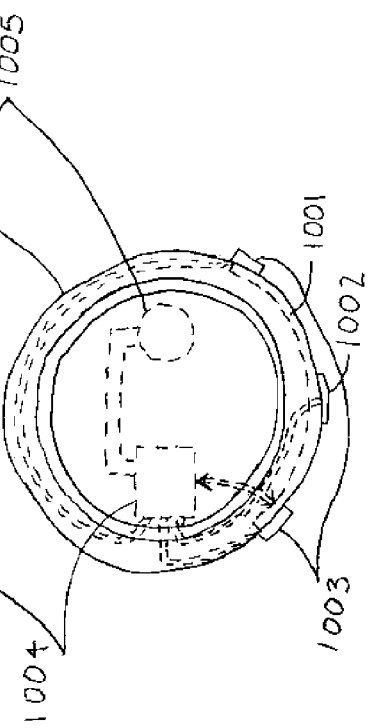
FIG. 10A
FIG. 10B
FIG. 10C
FIG. 10D

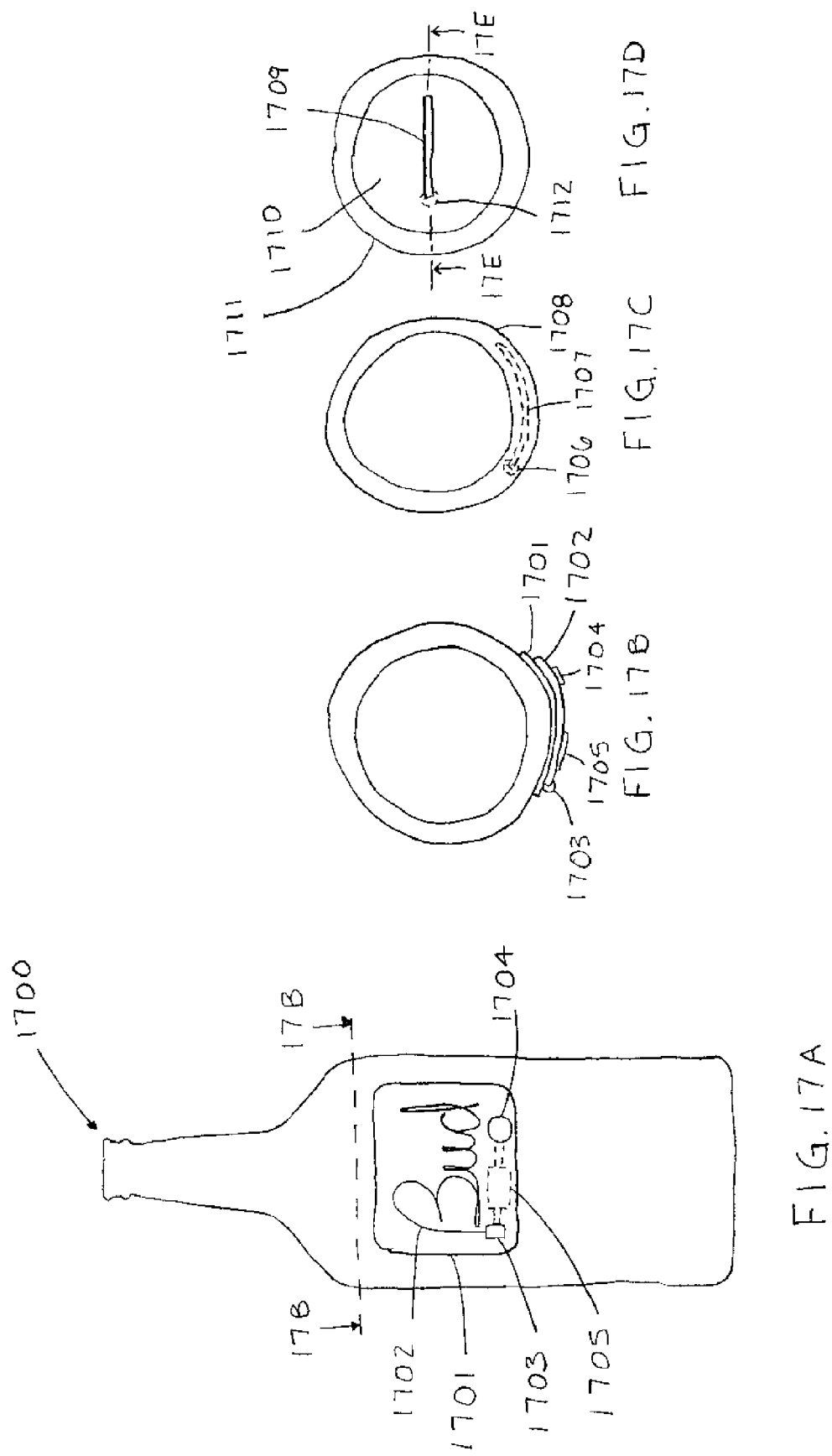

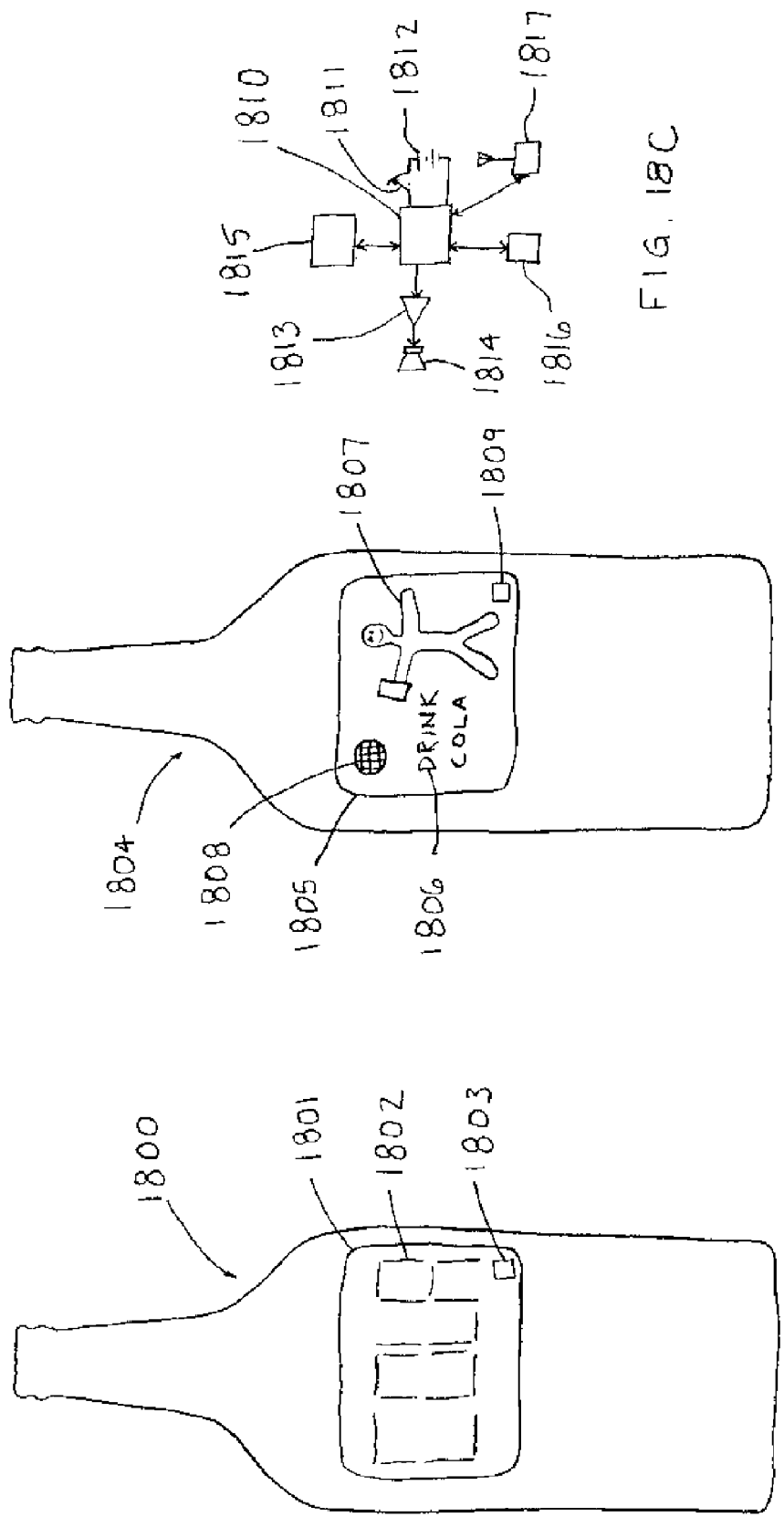

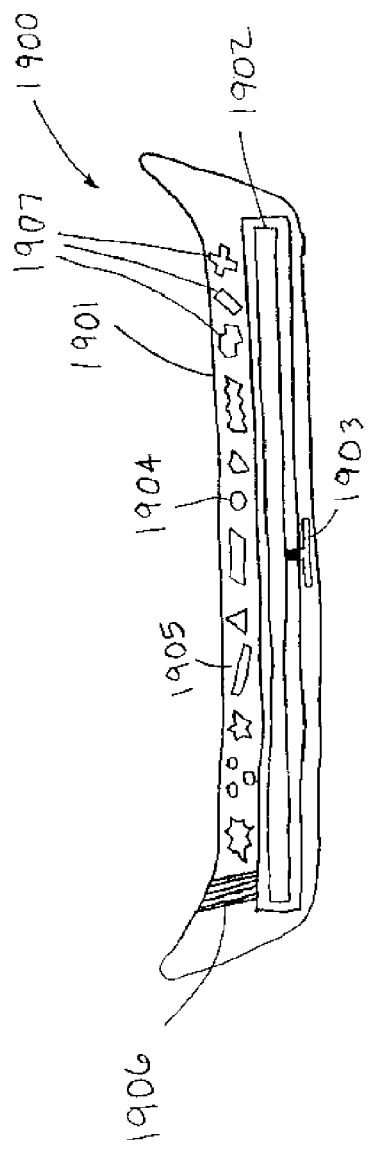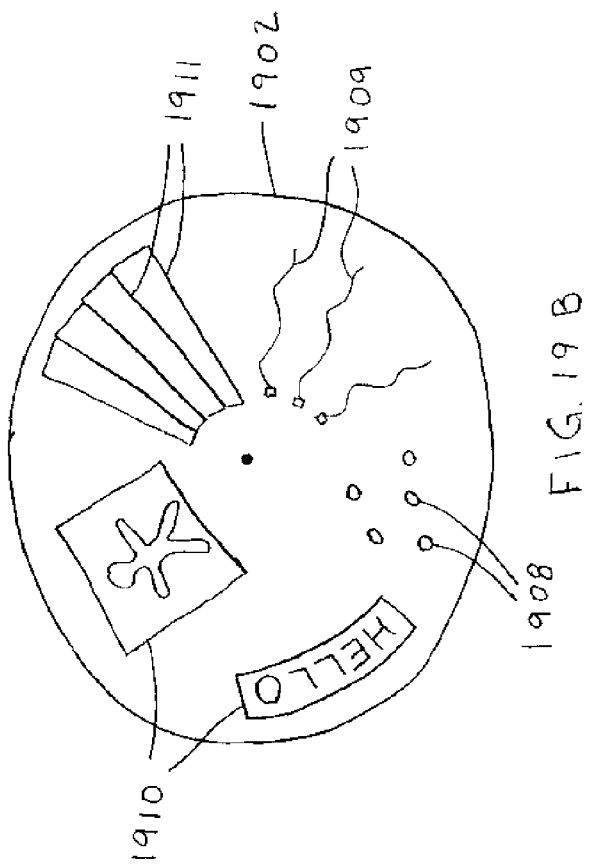

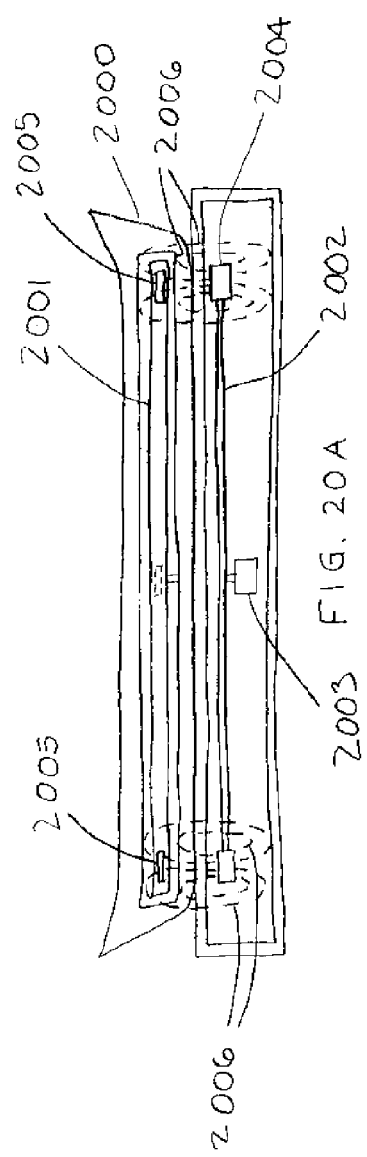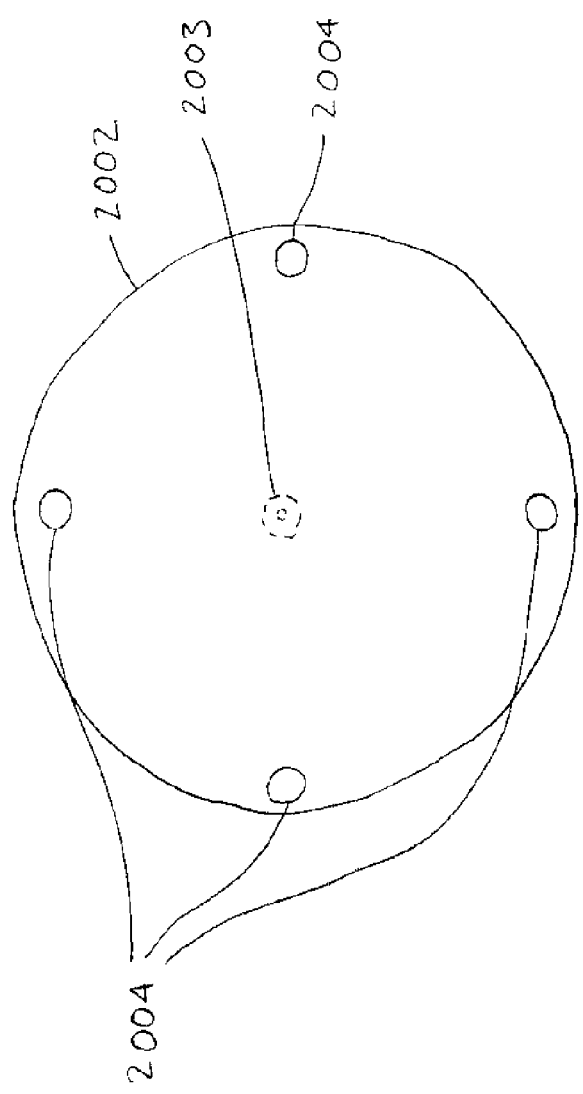

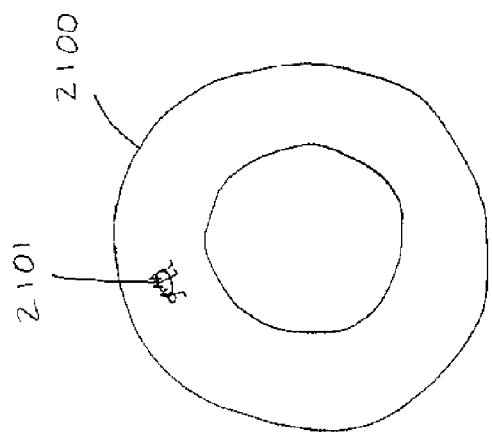
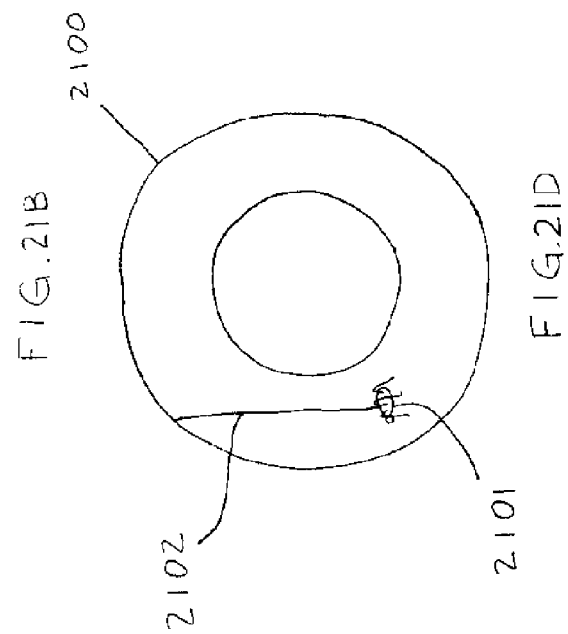
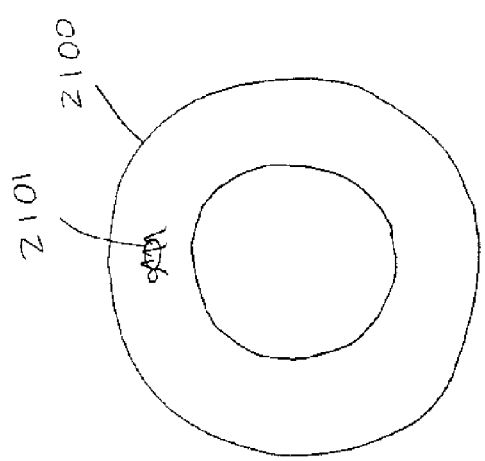
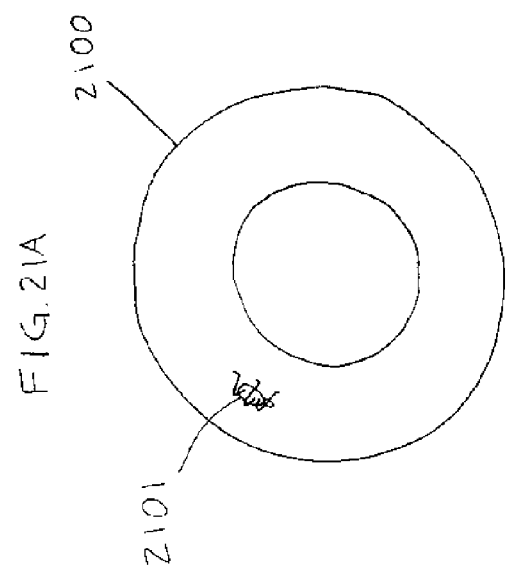

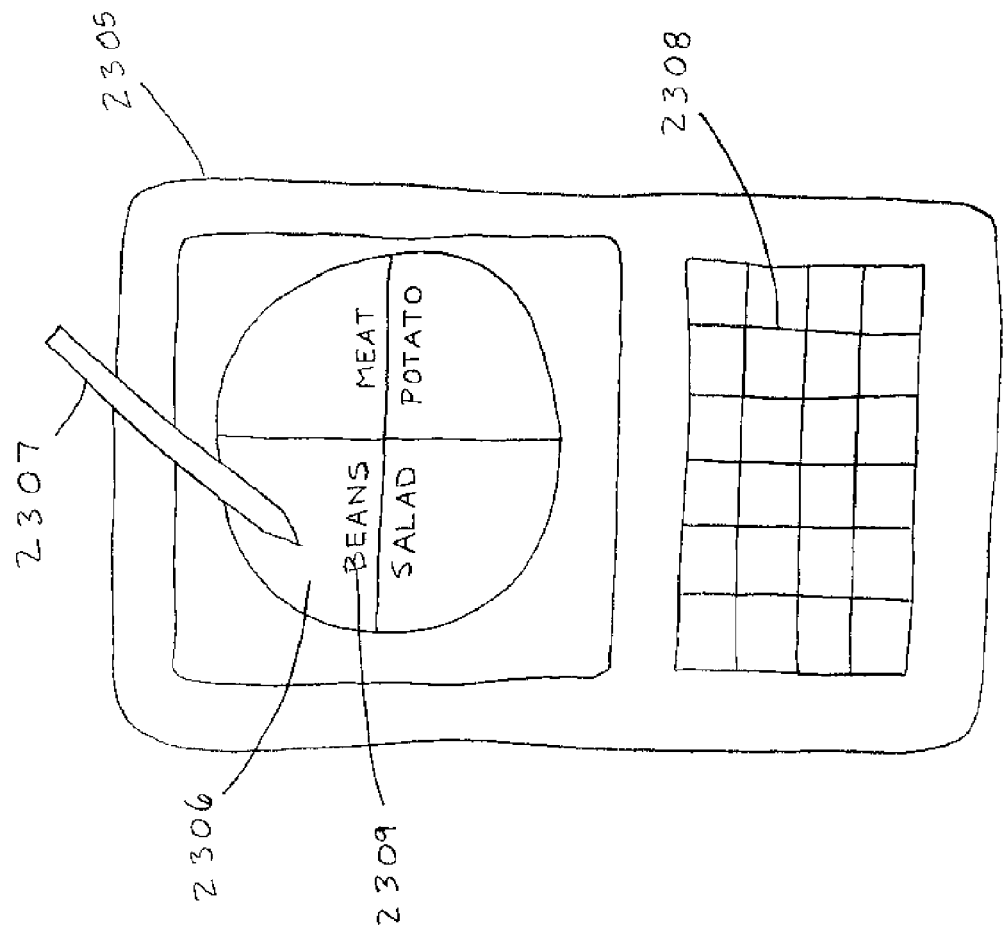

FOODWARE HAVING VISUAL SENSORY STIMULATING OR SENSING MEANS

TECHNICAL FIELD

The field of this invention is devices associated with food presentation and/or consumption.

BACKGROUND

Much of our lives are spent consuming food, including beverages. Ingestion is the primary object. However, there are a number of situations where one wishes to have some additional experience with eating. With a number of people, one can have a conversation associated with the consumption. However, eating alone can be a solitary experience. We have all seen restaurants where the diners are involved in eating and watching television. Children can be recalcitrant when a parent is trying to feed them. To encourage children to eat, various plate designs have been used. Labels on containers are static and limited to having a printed design. Fast food chains have various dishes with graphic designs, such as the latest movie hero. In these situations the diner is involved with stimuli other than the food for different purposes. The other stimuli can involve entertainment, distraction, reward or the like.

For the most part the diner does not have control over what is being presented, as in the case of television, or the presentation is static and quickly loses its attraction, as in the plate design. In addition, there is an interest in using the period of time in which the diner is eating to present information.

Also, there is an interest in providing dishware, utensils and beverage containers with attractive designs. At dinners, there is an effort to have the china, glassware, and utensils to be properly related to have an attractive table. On many occasions, one is celebrating an event or holiday where the decorations are related to the event or holiday. Having separate sets of china for each event is beyond the ability of most households to afford and store.

An opportunity exists to provide devices associated with food presentation that provide more than support for the food and can be modified in relation to the needs of a particular situation.

Relevant Literature

Garmaise, U.S. Pat. No. 5,678,925, describes a mug for sensing and indicating the temperature of its liquid contents. Tipton, U.S. Pat. No. 5,575,553, describes a container with light encapsulated in the sidewall for illuminating the sidewall. Crapio, U.S. Pat. No. 3,839,793, describes a utensil with exposed LED. Reber, et al., U.S. Pat. No. 5,969,606, describes a food storage container with humidity sensor. de Lange, U.S. Pat. No. 5,023,761, describes a utensil holder with light for illuminating the food at the working end of the utensil. Voskoboinik, et al., U.S. Pat. No. 5,485,355, describes cable-like electroluminescent light sources. Albert, U.S. Pat. No. 5,075,970, describes a sound-emitting utensil. Carson, U.S. Pat. No. 6,254,247 B1, describes a liquid container and method for producing a holographic image on the container.

SUMMARY OF THE INVENTION

The subject invention relates to foodware with single media or multimedia capabilities and optionally communication capabilities, which foodware is associated with visual, auditory and haptic feedback, and the like. Foodware is provided producing sensory signals, particularly in recognizable formats, where the signals are initiated by an independent action. Such foodware may also be associated with user input, such as verbal or contact, and can also be programmable. Typical foodware feedback may include optical sources, such as point light sources, images, and information; oral sources, such as microphones, speakers and voice synthesizers, allowing for verbal interaction and communication capability; haptic feedback, and the like. The foodware may directly or indirectly provide the signals, where the foodware, particularly translucent plates, can be seated on an underplate having the indicated capabilities. Components of the devices include processors, memory, power source, feedback devices, speakers, fiber optic components, light sources, ports, and the like. The foodware of the subject invention has a multitude of uses, including but not limited to informing or entertaining the user/diner, and may display television signals, radio signals, music player signals, computer signals and the like.

BRIEF DESCRIPTION OF THE DRAWINGS

FIG. 1 is a perspective view of a child using active foodware, such as a plate, fork and cup.

FIG. 2A is a plan view of a translucent square eating plate over a square underplate with LCD panel on its top. FIG. 2B is an end view of the translucent square plate over the square underplate. FIG. 2C is an end view of the square underplate with LCD panel on top.

FIG. 3B is an end view of a light fiber inside the body of the plate.

FIG. 5A is a cross-sectional view of a light channel in the plate of FIG. 6A. FIG. 5B is a cross-sectional view of a light fiber in a channel in the plate of FIG. 6B.

FIG. 6A is a top view of a plate with a light channel. FIG. 6B is a top view of a plate with a light fiber in a channel.

FIGS. 7A–7C are cross-sectional views of light fibers. FIG. 7A is a cross-sectional view of an unclad light fiber. FIG. 7B is a cross-sectional view of a light fiber with a portion of its cladding removed. FIG. 7C is a cross-sectional view of a light fiber with a portion of its wall etched or roughened.

FIG. 8A is a side view of a light fiber with light emitting diode (LED). FIG. 8B is an electrical schematic of a circuit for driving the LED. FIG. 8C is an electrical schematic of a circuit for driving one or a multiplicity of LEDs with an LED driver integrated circuit.

FIGS. 10A–10C are three frontal views of an active foodware container with a programmable moving image. FIG. 10D is a plan view of the container with image panel and circuitry components.

FIG. 17A is a side view of a container with a label with one or more active components. In this case, one active component is a light fiber. Also shown are an LED, on/off switch and circuit. FIG. 17B is a cross-sectional view of the container of FIG. 17A with a label with one or more active components. FIG. 17C is a cross-sectional view of a container with one or more active components inside the wall of the container. FIG. 17D is a cross-sectional view of a container with one or more active components inside the container. In this case, one active component is a light fiber.

FIGS. 18A and 18B are side views of containers with labels with one or more active components. FIG. 18A shows a 7-segment display. FIG. 18B shows a more complicated label including an LCD panel and speaker. FIG. 18C is a block diagram circuit associated with FIGS. 18A and 18B. The circuitry is not shown on FIGS. 18A and 18B for clarity.

FIG. 19A is a side cross-sectional view of an eating plate with a rotating component inside. FIG. 19B is a plan view of the rotating component of FIG. 19A. Among other things, the rotating component may comprise one or more active components. Among other things, the non-rotating portion of the eating plate may comprise one or more light guiding, light transmitting or light distorting components.

FIG. 20A is a side cross-sectional view of an eating plate with rotating component inside, where the eating plate is in functional relation to a plate base with powered rotating means magnetically coupled to the rotating component. FIG. 20B is a plan view of one example of magnetically coupled rotating means.

FIGS. 21A–21D are plan views of an eating plate with a multi-pixel LCD display capable of displaying static images or images which appear to move.

FIG. 23B is a plan view of a control pad for communicating information to the plate of FIG. 23A.

DETAILED DESCRIPTION OF THE INVENTION

Figure 3A:
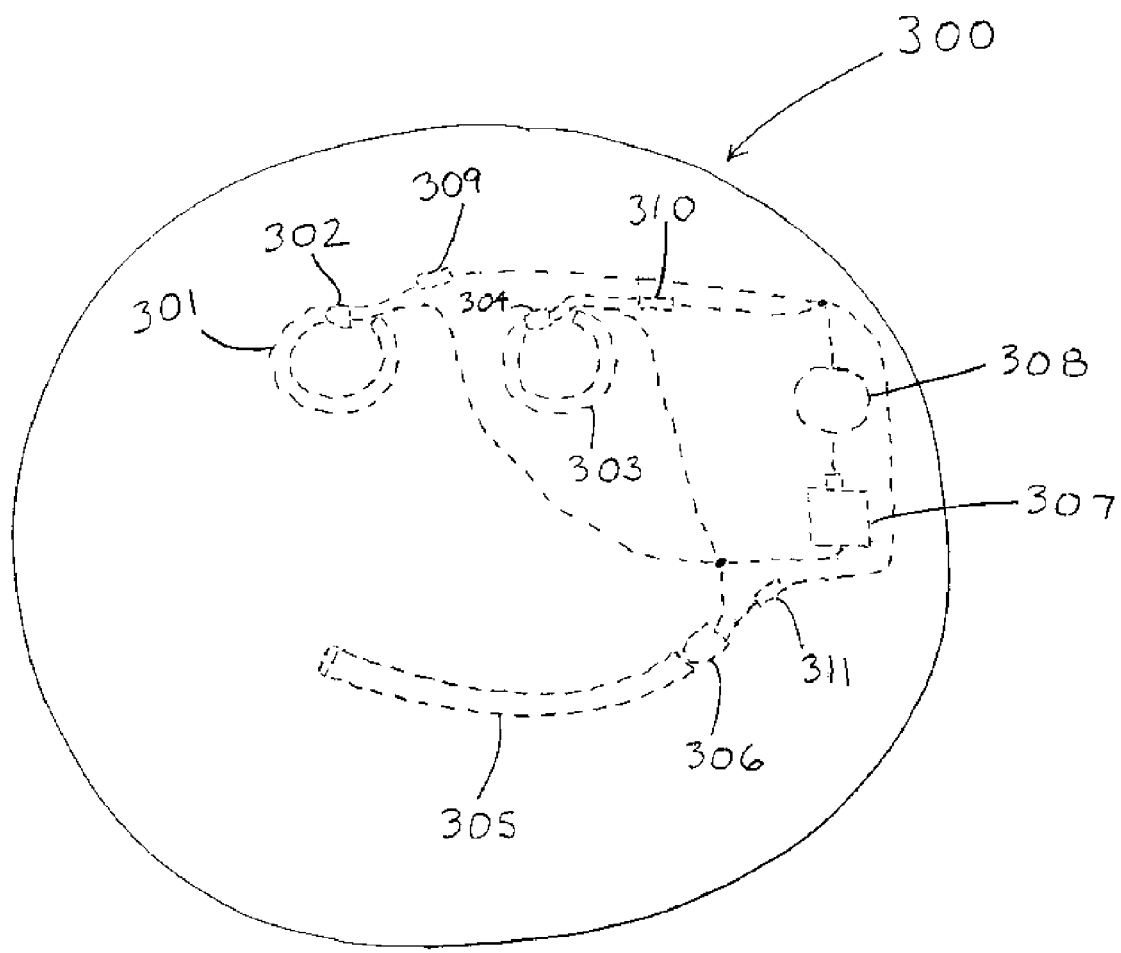
FIG. 3A is a plan view of a round eating plate with light fibers and associated circuitry inside the body of the plate.

Active foodware is provided that can afford single media or multimedia presentation. The foodware comprises devices that provide at least one of visual, auditory and haptic stimuli, usually at least visual. The foodware comprises a power source or means for receiving power, devices for producing signals and may also include devices for sensing and/or receiving signals. The foodware may include all of the sensing and stimuli producing devices or be associated with an apparatus compatible with the foodware and serving to fulfill at least a portion of the production of the stimuli and/or the sensing. The foodware and/or associated apparatus will also include the circuitry to control the devices and perform the various activities provided by the foodware and associated apparatus.

When referring to "foodware" it is intended to include devices associated with the presentation, storage, utilization or consumption of food. Foodware includes dishware, utensils, containers, and ancillary devices used with such entities, such as an underplate to support a plate or a cup holder to support a cup. Each of such entities is active in employing electrical power to provide feedback to a user/diner and/or sensing user/diner input.

Of particular interest are plates, which can be used for presenting food, particularly with conventional or active utensils and drinking receptacles, for demonstration of various designs, for providing information or entertainment, etc. The plate will usually be the center of the active foodware involving most, if not all, of the stimuli to the user/diner.

The plates may have all of the circuitry and stimuli producing devices contained in the plate. For example, by molding an upper or lower layer of a plate having compartments and channels for housing the devices and connecting the devices, the various devices may readily be placed in their appropriate positions and relationships and connected accordingly. One may then seal all of the devices with potting compound, epoxy, fiberglass, and the like, to protect the devices and connectors from moisture. A complementary layer, e.g., undercover, can be attached while the sealant is curing, so as to be bonded to the sealant and provide for an attractive plate, e.g. an attractive underlayer. Alternatively, one may provide for a channel proximal to the edge of the plate with an underlayer having a ridge fitting into the channel. By having a sealant in the channel or on the ridge, fitting the ridge into the channel will hermetically seal the upper and lower layers to form the plate. The design will allow for chambers, leads or the like at the periphery of the plate for connection to other components, such as batteries, antennae, etc. A compartment can be provided at the periphery for receiving a battery that would be in operative connection with the internal devices through leads, pads, etc. that can be made of corrosion resistant materials, to allow for washing of the plate after removing the battery.

The manner in which the upper and lower layers of the plate are sealed is to provide for a water resistant seal. In this way the plate can be washed and the devices and circuitry between the layers are protected from corrosion. By having an external power source or providing for a sealed compartment for receiving a power source, one can provide an integral plate that only lacks the power source, but can be connected with the power source when in use.

In a useful embodiment, a plate may receive power inductively from a power source external to the plate, so the plate may be entirely sealed with a water resistant seal. A power source external to the plate may contain primary windings, and secondary windings may be contained in the sealed plate such that an electrical transformer is created where the secondary windings receive electrical power from the primary windings. When power is inductively transformed to a plate, the primary windings of the external power source are positioned in functional relation to the secondary windings in the plate to provide for electromagnetic coupling. The primary windings of the external power source may be wound around a portion of an iron protuberance which may be inserted into a mating cavity in the plate. The secondary windings in the plate may encircle the cavity. The use of such an iron protuberance and mating cavity can improve the efficiency of the transfer of electromagnetic energy from the external power source to the plate. A single plate may contain multiple protuberance/cavity mates. Although the use of inductively powering a plate is discussed here, any other active foodware item may be similarly inductively powered.

Such an inductively coupled power source finds particular use when an electroluminescent light source, such as provided by Voskoboinik et al., U.S. Pat. No. 5,485,355, is used. In such a case, the secondary windings in the active foodware item may be separate from the electrodes of the electroluminescent light source, or the electrodes of the electroluminescent light source may co-function as all or a portion the secondary windings.

The plate unit may have a translucent, usually clear, upper plate and an underplate having the various devices for the stimuli. The translucent plate can be glass or various plastics, such as polycarbonate, plexiglass, polyethylene, polypropylene, poly-4-methylpentene-1, delrin, etc. The translucent plate may be readily molded and will be relatively thin to allow for efficient transmission of light from the underplate. Thicknesses in the range of about 1 to 5 mm may be employed. In addition, various designs may be incorporated into the clear plate to cooperate with the stimuli emanating from the underplate.

The foodware may accept downloading of video files, movies, pictures, etc. The downloading may be done offline or streamed in real time. The downloading may be via a wired or wireless link. The downloading may be from a website. The foodware may accept external hardware media such as DVDs, CDs and memory sticks, where the content may be seen and/or heard on the foodware. By having ports, connectors or receivers for receiving external signals that can then be presented as stimuli, the system provides great flexibility. Thus, the foodware can be self-contained or rely or external devices to receive signals which are then presented to the user/diner.

Typical active foodware visual displays include light guides (such as optical fibers, electroluminescent light sources, light channels in the foodware material, light tubes, and the like), liquid crystal displays, light emitting diodes, laser diodes, plasma displays, fluorescent lights, fluorescing fluids, incandescent lights, and the like. The foodware may include haptic feedback, including but not limited to vibrotactile feedback, tactile feedback and force feedback, so the user/diner may feel desired vibrations, jolts, impacts or movements of the foodware. A useful vibrotactile feedback element is a rotating motor with eccentric mass, such as is found in vibrating cell phones. Typical auditory feedback displays include voice-coil speakers, piezoelectric speakers, and the like, including speakers and sound-generating elements used in cell phones.

The foodware may accept wired or wireless input that affects the visual, auditory or haptic display of the foodware, such as signals from a data processor. For example, the foodware may accept voice input, wired or wireless mouse input, wired or wireless peripheral device input. Games may be played using the foodware where the active foodware plate is a visual feedback display. The foodware may have controls built into the foodware itself for controlling the displayed content, providing game control input, communicating with other foodware, and the like.

One item of active foodware may communicate information with another item of active foodware. An active foodware fork may communicate its movement to an active foodware plate of the same user/diner or the active foodware plate of a different user/diner. A computer which typically is not in physical contact with the foodware may communicate with the active foodware in real time or offline.

Active foodware may include corded telephone technology, cordless telephone technology, walkie talkie technology, mobile/cellular telephone technology, internet access, web searching technology, and the like.

Advertisers may combine promotions with active foodware. For example, a fast-food store may provide active foodware cups, plates and/or utensils with moving and/or talking movie characters or interactive games on them.

The subject invention is further described in detail hereunder referring to the embodiments provided in the drawings.

FIG. 1 shows a user/diner 100 seated at a table 101 using a variety of active foodware items, including an active plate 102, an active fork 103 and an active cup 104. Only these three foodware examples are shown in the figure; however, many different items used to eat, drink, contain, serve, support, pour, store, prepare, hold, and mix food are considered foodware according to the subject invention. For clarity, the active plate 102 does not have any food on it. Such foodware may comprise one or a multiplicity of a variety of active sensory stimulating and sensing components. Visual sensory stimulating components include but are not limited to light emitting diodes (LEDs), optical fibers, optical tubes, electroluminescent light sources, optical channels, liquid crystal display (LCD) panels, incandescent lights, fluorescent lights, fluorescing fluids, and the like. Such active foodware may comprise one or a multiplicity of auditory sensory stimulating components, including but not limited to voice-coil speakers, piezo-electric speakers, and other sound generating components. Such foodware may comprise one or a multiplicity of sensing components, including but not limited to contact sensors, touchscreens, motion sensors, proximity sensors, temperature sensors, moisture sensors, pressure sensors, light sensors, sound sensors and the like. Such foodware may also comprise one or a multiplicity of haptic feedback components, including but not limited to tactile, vibrotactile and force feedback components to provide tactile and force feedback to the user/diner. Such foodware may provide a multimedia dining experience to the user/diner.

FIGS. 2A–2C provide one embodiment of the subject active foodware invention where an LCD screen is positioned in functional relation to an eating plate surface. This embodiment provides a rectangular active plate assembly 213 comprising an active underplate 201 with LCD visual display 202 and a non-active eating plate 200 with at least a portion of the top surface 212 being translucent to allow viewing of at least a portion of the information provided by the visual display 202. The non-active eating plate 200 may be attached to the active underplate 201 or left unattached. FIG. 2A is a plan view of the non-active eating plate placed over the active underplate. FIG. 2B is a side view of the non-active eating plate 200 above the active underplate 201. FIG. 2C is a side view of the active underplate. The non-active eating plate 200 may contact the table via supports 210 where the active underplate is accessible via openings 211 between the supports 210. Alternately, the non-active eating plate may be supported by the active underplate and not contact the table surface directly.

The active underplate 201 of FIGS. 2A–2C comprises a processor 203 which generates a display control signal that is used by the display amplification circuitry 214 to drive the visual display 202. The interconnections are not shown here in FIGS. 2A–2C, but a general functional block diagram is provided later in FIG. 13. The electrical details are known to those skilled in the art. The active underplate 201 further comprises battery 204, electrical adapter/battery charger connector 208, speaker 207, on/off switch 206, external media slot 205 and data adaptor 209. The external media slot 205 may accept any of a variety of past, present or future media, including but not limited to CDs, DVDs, floppies, tape, memory sticks, and the like. The data adaptor 209 represents one or a multiplicity of port connectors for a variety of wireless and wireline data, and may be a USB connector, Firewire connector, serial connector, parallel connector, infrared connector, electromagnetic connector, and the like. In FIGS. 2A–2C, data adaptor 209 and electrical adaptor/battery charger connector 208 are optionally obstructed by supports 210 for safety reasons to prevent wired connection during dining to any device that might present an electrical hazard if a liquid were spilled on the wire or connection during dining.

FIG. 3A is a plan view of one embodiment of the subject invention where a visual display is made up of light guides, such as light fibers, electroluminescent light sources, light tubes, light channels and the like being placed in functional relation to an eating plate. In this embodiment, representations for two eyes and a smile are illuminated by light guides. The left eye comprises light guide 301 and associated LED 302; the right eye comprises light guide 303 and associated LED 304; and the smile comprises light guide 305 and associated LED 306. FIG. 3A also shows a power source 307, on/off switch 308 (such as a single pole, single throw switch), electrical resistors 309, 310, and 311, along with the interconnections. The embodiment as shown provides a very simple circuit where pressing the on/off switch illuminates the LEDs and their associated light guides. In a more complicated embodiment, a processor may be used to provide more sophisticated lighting effects. Electrical circuits to provide a wide variety of lighting effects are well known by those skilled in the art.

The power source 307 may be a battery, and may be rechargeable and may be replaceable. The battery may also be manufactured into the plate such that is cannot be user replaced. If rechargeable, the battery may be removed and recharged. Alternatively, the battery may be left in the plate and recharged via a connector (not shown) on the plate. If it is desired to not have any openings or connectors to the plate, the battery may also be associated with a transformer in the eating plate (not shown) so it can be inductively charged via an external electromagnetic field. The battery may also be associated with a photovoltaic cell in the eating plate (not shown) which charges the battery using light.

The lighting power source, circuitry and/or one or more lighting components may be removable. The lighting components and circuitry may be located inside the material of the eating plate or positioned below the eating surface. In such cases, the eating surface should be translucent to permit at least a portion of the light escaping from the lighting components beneath it to be viewed by the user/diner. The eating plate may be manufactured from typical eating plate materials, such as China, glass, ceramic, plastic and the like. Translucent portions of the plate may be made from any hard non-toxic translucent material such as glass, plastic and the like. Translucent liquids may also be encapsulated between the light source and surface of the eating plate.

FIG. 3B is a side view of the plate of FIG. 3A where only the light guide 305 and associated LED 306 producing the smile are shown for clarity, and which in this case are located inside the material of the eating plate.

Figure 4B:
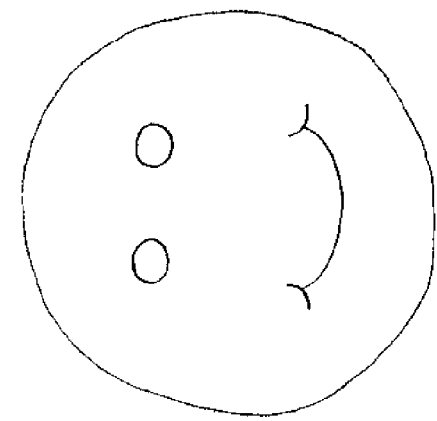
FIGS. 4A–4D are examples of simple designs which may be made by embedding light guides into a plate with translucent top surface. Each line shown inside the periphery of the round plate represents a portion of a light guide.
Figure 4D:
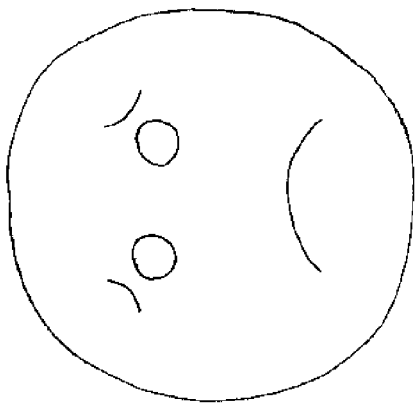
Figure 4A:
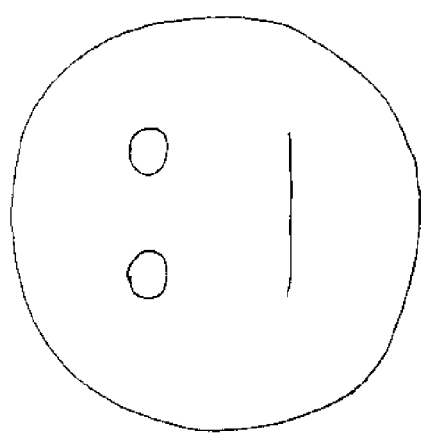
Figure 4C:
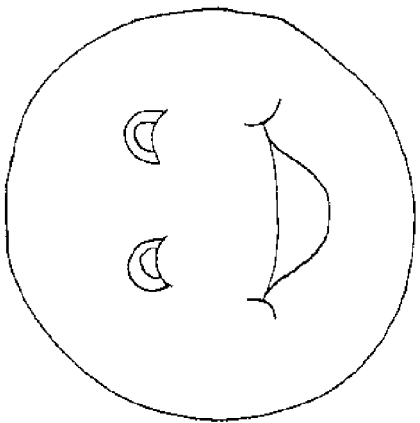

FIGS. 4A–4B are various eating plate designs that can be easily produced using the light guide embodiment of FIGS. 3A and 3B. Multiple light guides may co-exist in a single eating plate and be selectively activated to provide the illusion that the face is changing expression. In FIGS. 4A–4B, the lines making up the eyes and mouth may be produced using one or a multiplicity of light guides per facial line.

FIG. 5A is a cross-sectional view at section 5A—5A of the plate 500 of FIG. 6A. There is a channel 501 in the plate for directing and diffusing light from light source 502 on its way to the reflective surface 507. Light may be reflected internally or the light may refract. The refracted light that escapes the surface of the plate may be viewed by the user/diner. The diameter of the channel may be selected so that a desired amount of light escapes the channel for viewing by the user/diner. The surface roughness and optional coatings may also be selected to determine the amount of light that escapes the channel. Such augmentation of the channel may be graded to provide a desired intensity of glow along the channel by the user/diner. For example, it might be desired to have the ends of the channel emit more light, i.e., glow more, than the middle, or visa versa, or it might be desired to have a uniform glow along the length of the channel.

In a related embodiment, the channel may be filled with a fluorescing gas, material, liquid or other fluid, and where the light source 502 is an energy source that causes the gas, material or fluid to fluoresce.

FIG. 5B is a cross-sectional view at section 6B—6B of the plate 503. There is a channel 505 into which light guide 504, such as an optical fiber, electroluminescent light source, or light tube, resides. The light guide has a light source 506 at one end and may have an optional reflective surface 508 at the other. The index of refraction of the light guide and of the plate channel, as well as any gap between the guide and channel wall, may be selected to produce the desired amount of refraction and perceived glow of the channel by the user/diner. Such optical technology is known by those skilled in the art.

FIG. 7A is a cross section of a light guide 700. Such a guide may be an optical fiber, electroluminescent light source, optical tube, or any other appropriate light guiding element. FIG. 7B is a light guide 701 with cladding 702 to help prevent light from escaping. In FIG. 7B, a portion 703 of the cladding has been removed to allow a desired amount of light to escape from a desire section of the guide. FIG. 7C is a cross section of a light guide 704 where a portion 705 of the light guide has been modified to allow light to escape. A light guide may be modified using a variety of techniques, such as by etching, scoring, and the like.

FIG. 8A is a side view of a light guide 800. There is a light source 801 at one end and an optional reflective surface 802 at the other end. The light guide may be an optical fiber, electroluminescent light source, light tube or any other suitable light guiding element where light can be allowed to escape and pass through a translucent foodware material for the user/diner to see. When the light guide is an optical fiber, theoretically, light 803 that does not exceed a critical angle of inflection will be internally reflected, whereas light 804 that does exceed the critical angle of inflection will be refracted according to Snell's Law. Refracted light that passes through a translucent foodware material may be viewed by the user/diner. The light guide may also be a light tube with openings permitting the light to escape in desired locations and amounts.

Light sources are commonly light emitting diodes (LEDs) and/or laser diodes, but can be any of a variety of light producing devices, including incandescent lights, fluorescent lights, glowing coils, and the like.

FIG. 8B is a simple electrical circuit schematic for driving an LED. When the switch 805 is closed, electrical current 806 from the power source 807 passes through the wires 808, through the resistor 809 and through the LED 810, causing it to give off light.

FIG. 8C shows an integrated circuit block 811 with a digital processor and memory which is powered by a power source 812. When the processor detects that the switch 813 is closed, it runs a program in its memory that determines which of the light sources 814 to energize and when. The technology for creating such a circuit is known to those skilled in the art and actual circuit implementations may vary considerably. The invention is not limited to an embodiment using the simple circuits provided here.

Figure 9B:
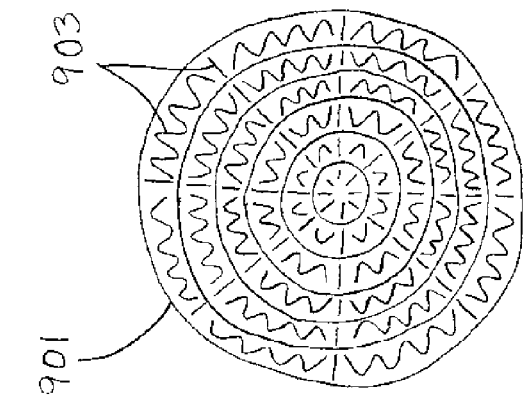
FIGS. 9A–9D are plan views of plates with various active foodware designs produced by one or more visual display technologies, such as light fibers, LEDs and LCD panels.
Figure 9D:
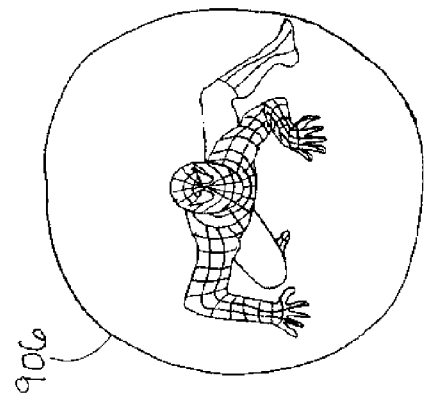
Figure 9A:
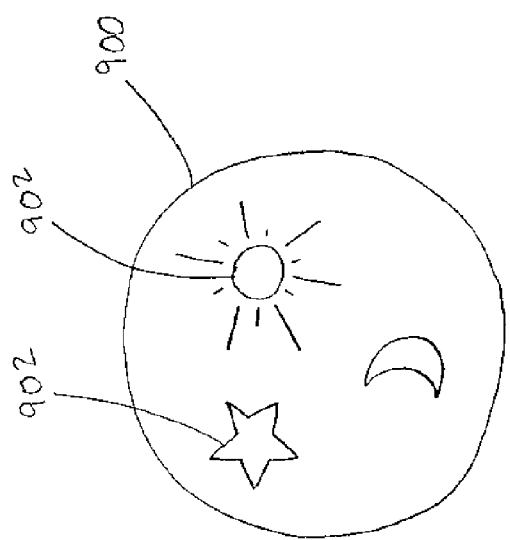

FIGS. 9A–9D are active foodware plates with varying visual display designs and technologies. Auditory output may be combined with any of these visual displays. FIGS. 9A and 9B are plates 900 and 901, respectively, using light guides to create desired patterns and designs. Each of the lines 902 and 903 may be illuminated using optical guides, including but not limited to "lossy" (i.e., which allow some light to escape to be viewed by the user/diner) optical fibers, electroluminescent light sources, light channels, light tubes and the like.

Figure 9C:

FIG. 9C is a plate 904 comprising one or a multiplicity of LEDs 905 which may be illuminated in a desired sequence or in response to user/diner or food activity. The LEDs may be any of a variety of technologies and desirable colors, including but not limited to, red, yellow, blue, green, and the like. A matrix of colored LEDs may be used in combination to produce a composite image where one or more LEDs represent a single picture element (pixel).

FIG. 9D is an active foodware plate 906 comprising an active LCD screen capable of displaying a large number of different images. The LCD screen may have a uniform matrix of pixels where any arbitrary image or alphanumeric character may be displayed. Alternatively, to reduce cost and complexity, the LCD screen may include only portions of a limited number of images or alphanumeric characters. By sequencing the LCD through a pattern of pixels or preset images portions, the user/diner may perceive an object or alphanumeric character to move. Moving or non-moving objects visually displayed on the foodware may be associated with sound coming from the foodware to provide a more multimedia experience.

The user/diner may load pictures or movies to the active foodware plate for display, such as wedding pictures, baby pictures, pictures or movies from a trip and the like. Entertaining and/or other desired images, artwork, videos, graphics, sounds, haptic sensations, "screen savers" and the like, may be downloaded from websites for display on the active foodware, such as plates. Digital images of the tablecloth or other desirable colors or patterns may be loaded and displayed on the plate so the plate matches the tablecloth or a dinner party theme. Slideshows may be displayed on the active foodware plate. Movies may be displayed on the active foodware plate. The plate may be associated with a television tuner, TV cable, satellite dish, and the like, such that the user/diner may watch television on their plate. The active foodware plate may serve as a computer monitor. Sounds may be recorded and played back through a speaker or vibrating portion associated with the plate. For example, the plate could display stationary or moving text saying, "Happy Birthday, Jill!" while simultaneously audibly displaying the "Happy Birthday" song through the speaker. At the end of the song, an image or movie of Jill as a baby may be displayed on the plate.

FIGS. 10A–10C are three frontal views of an active foodware liquid container, in this case an active foodware cup 1000 with visual display 1001, auditory display 1002, user/diner interaction controls 1003, processor 1004 and power source 1005. The three views show an image perceived by the user/diner to move from the right to left by successively changing the displayed position of the image. The display uses any technology capable of displaying an image, including but not limited to LCD technology, LED technology, plasma screen technology, and the like. The cup may have user controls for turning on the display, interacting with the image, playing a game, communicating with others, or otherwise controlling the operation of the cup. The cup may provide auditory feedback to the user/diner via the auditory display 1002. The auditory feedback may be sounds associated with the image and the sounds need not be associated with the image. The auditory feedback may contain speech, music, beeps and other noises and sounds. The auditory feedback may provide advertisements and entertainment. The cup may accept auditory input from the user/diner via a microphone (not shown). FIG. 10D is a plan view of the active foodware cup 1000 of FIGS. 10A–10C.

Figure 11:
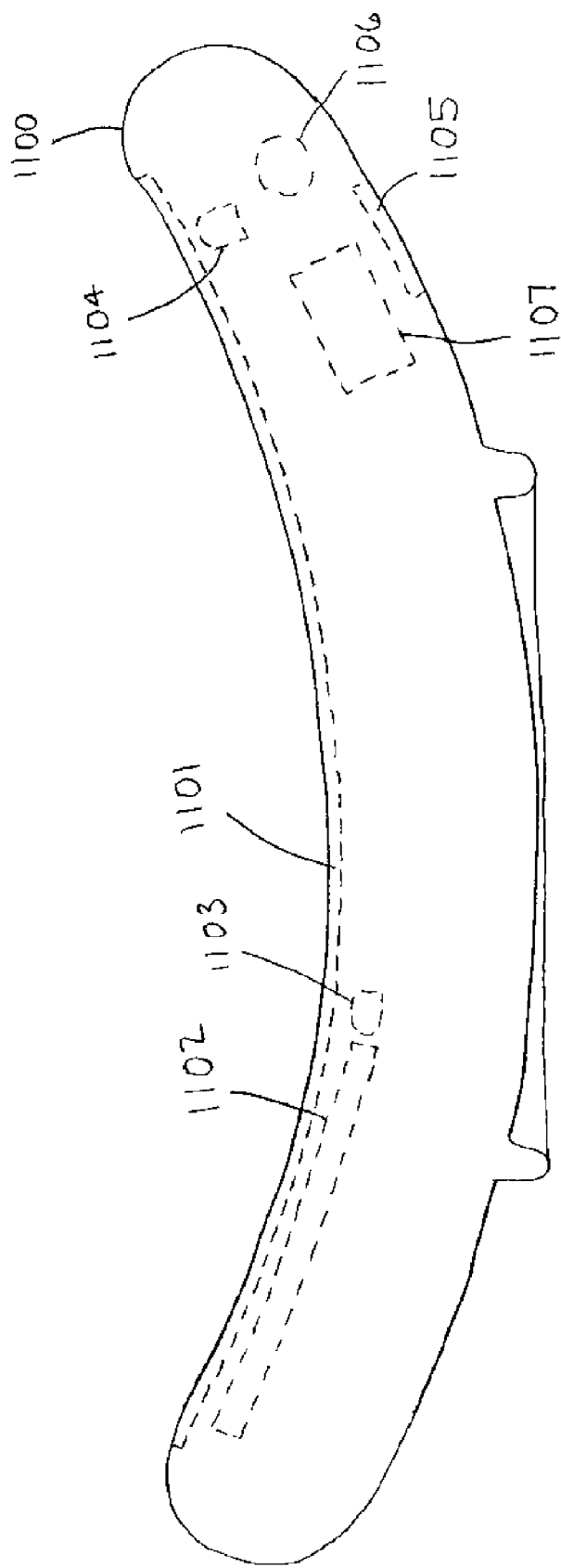
FIG. 11 is a cross-sectional side view of a plate with one or more active components, including, but not limited to a light guide, an LED, an LCD panel, an on/off button, a digital processor and a battery. The interconnections are not shown for clarity.

FIG. 11 is a side cross-sectional view of an active foodware plate 1100 comprising a variety of visual displays, including an LCD screen 1101, a light guide 1102 with associated guide-illuminating LED 1103 and a separate LED 1104. Although one of each of three visual display components is shown in FIG. 11, an active foodware plate may comprise only one of these visual display components, or it may comprise more than one of such visual displays, and/or an active foodware plate may comprise other visual displays not shown in this figure, such as a plasma display, a fluorescent display, and the like. The active foodware plate of FIG. 11 also comprises a switch 1105, which may be used to turn on/off the visual display(s), a power source 1106 and a processor 1107. An active foodware plate may comprise multiple switches and controls to control a variety of modes and functions of the active foodware plate. The power source may be a battery, rechargeable battery, A/C to D/C power supply, transformer and the like. The processor has memory, a program in the memory and connections to the visual displays, switch and power source, where the program is able to cause the visual displays to be illuminated in a desired manner and/or display a desired image. The processor may be a central processing unit (CPU), microcontroller, microprocessor, digital signal processor (DSP), and the like. Interconnections between the components of FIG. 11 and the specific electrical circuitry are known by those skilled in the art and so they have been omitted from the figure for clarity.

Figure 12A:
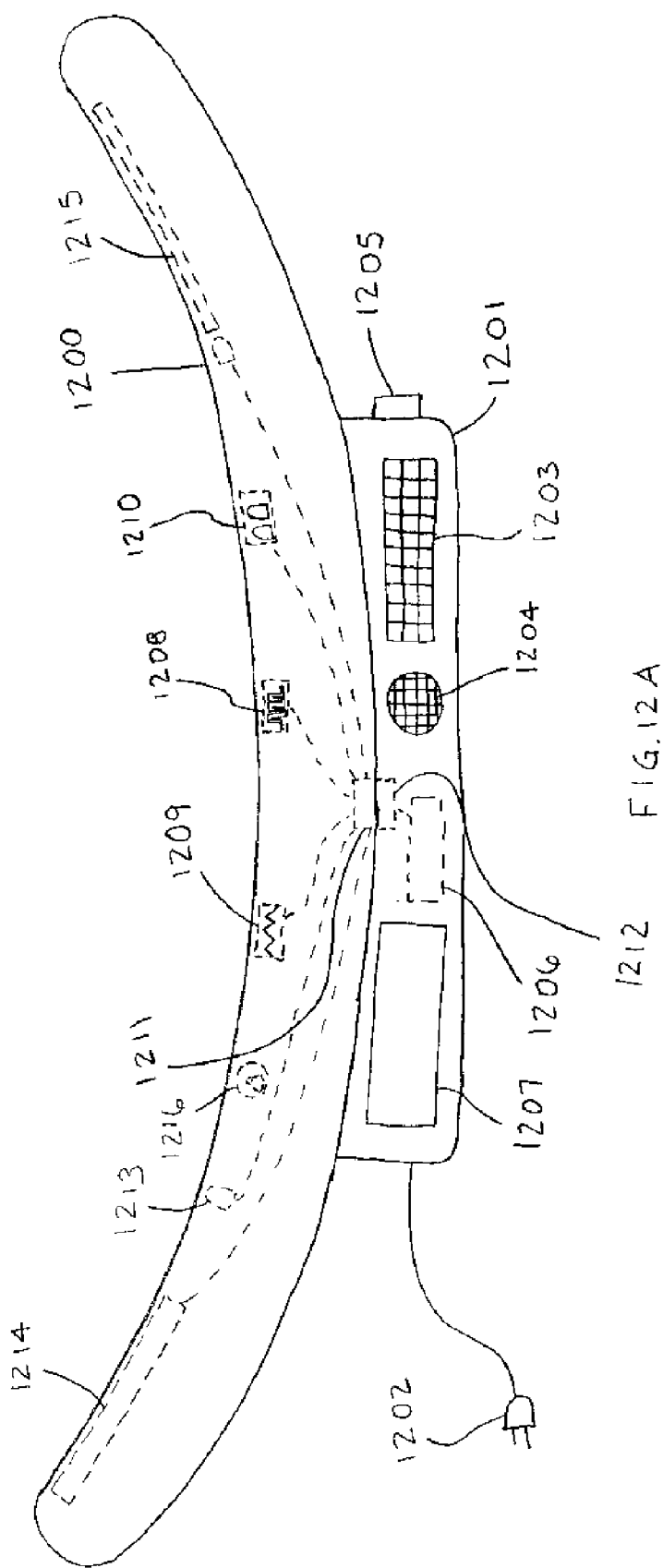
FIG. 12A is a cross-sectional side view of a plate positioned in functional relation to a plate base where the plate has one or more sensors, and where the plate and plate base can communicate information between each other.
Figure 12B:
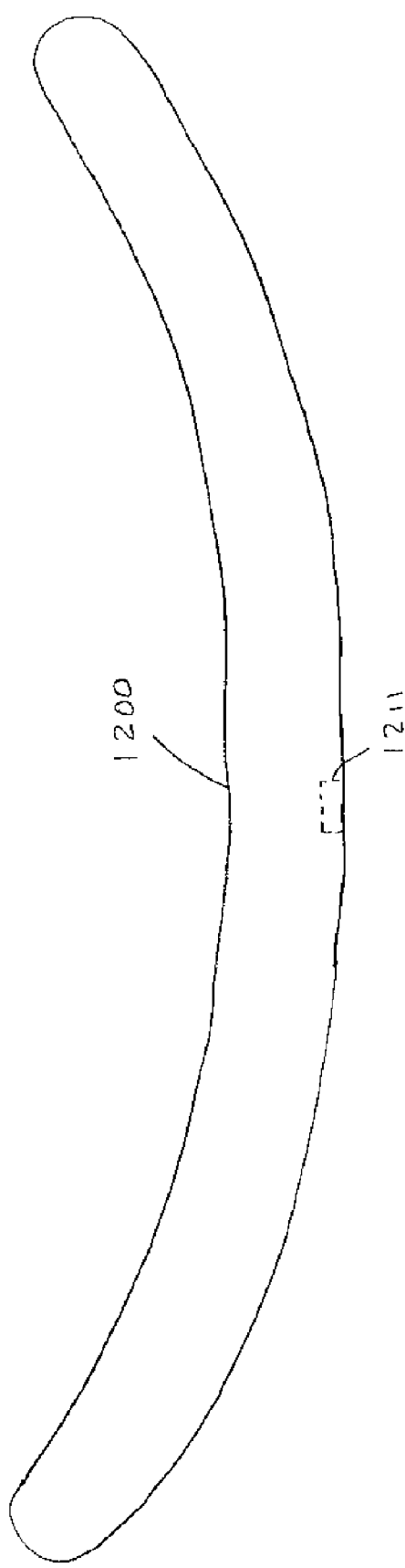
FIG. 12B is a simplified cross-sectional view of the plate of FIG. 12A where only the connector is shown.
Figure 12C:
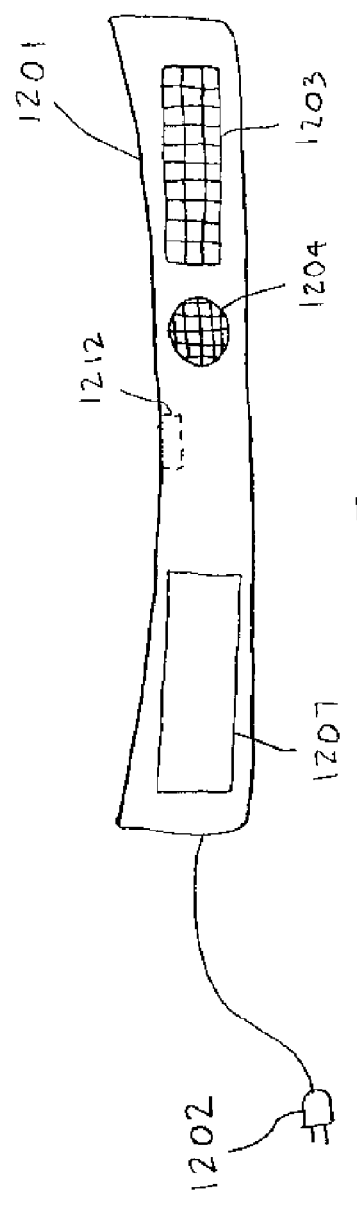
FIG. 12C is a side view of the plate base of FIG. 12A.

FIGS. 12A–12C are side cross-sectional views of an active foodware plate comprising an eating plate 1200 in functional relation to a non-eating underplate 1201, where the eating plate and non-eating underplate are not permanently affixed to each other. Such a configuration of eating plate 1200 and non-eating underplate 1201 finds use when it is desired to submerge the eating plate in water or place it in a dishwasher, which, depending on design choices, might not be advisable for the non-eating underplate. For instance, the non-eating underplate might have a cord and wall plug 1202 for 110 V or other high voltage alternating current electrical power. The non-eating plate might also have a speaker 1203 (such as a voice-coil speaker), microphone 1204, a switch 1205, a processor 1206 and other components and compartments 1207 that might not fair well if submerged in water.

The eating plate of FIGS. 12A and 12B has at least one sensory element capable of providing feedback or sensing a state. Such a sensory element includes, but is not limited to an LED 1213, and LCD screen 1214, a light guide 1215, a plasma screen, a fluorescent light, an illuminating fluid, a haptic feedback actuator 1216 (such as a vibrotactile feedback actuator, a tactile feedback actuator, a force-feedback actuator, and the like), a pressure sensor 1208, a temperature sensor 1209, a tilt sensor, a proximity sensor, a speaker 1203, a microphone 1204, an electromagnetic sensor, a motion sensor a position sensor, a velocity sensor, an acceleration sensor, a heart rate sensor, a blood pressure sensor, a calorimeter, and the like.

As depicted in FIG. 12A, a pressure sensor 1208 may comprise a strain gage placed under the surface of the plate and electrically connected to a Wheatstone bridge electrical circuit (not shown, but known to those skilled in the art). A temperature sensor 1209 may comprise a thermistor (electrical circuit not shown, but known to those skilled in the art). A proximity sensor may comprise an infrared emitter-detector pair of LEDs 1210 (electrical circuit not shown, but known to those skilled in the art). These sensors communicate their signals to the processor (memory and interconnections not shown, but known to those skilled in the art) via the connector 1211 on the eating plate mating with connector 1212 on the non-eating underplate.

The eating plate of FIG. 12B may communicate information with the non-eating underplate of FIG. 12C via a wired or wireless connection. Wired connections include, but are not limited to comprising metal contacts which touch mating metal contacts. Wireless connections include, but are not limited to electromagnetic communication, light-based communication, acoustic communication, and the like. Electromagnetic communication may be used to communicate data as well as power, typically via transformer. Light-based communication may include optoisolators.

Figure 13:
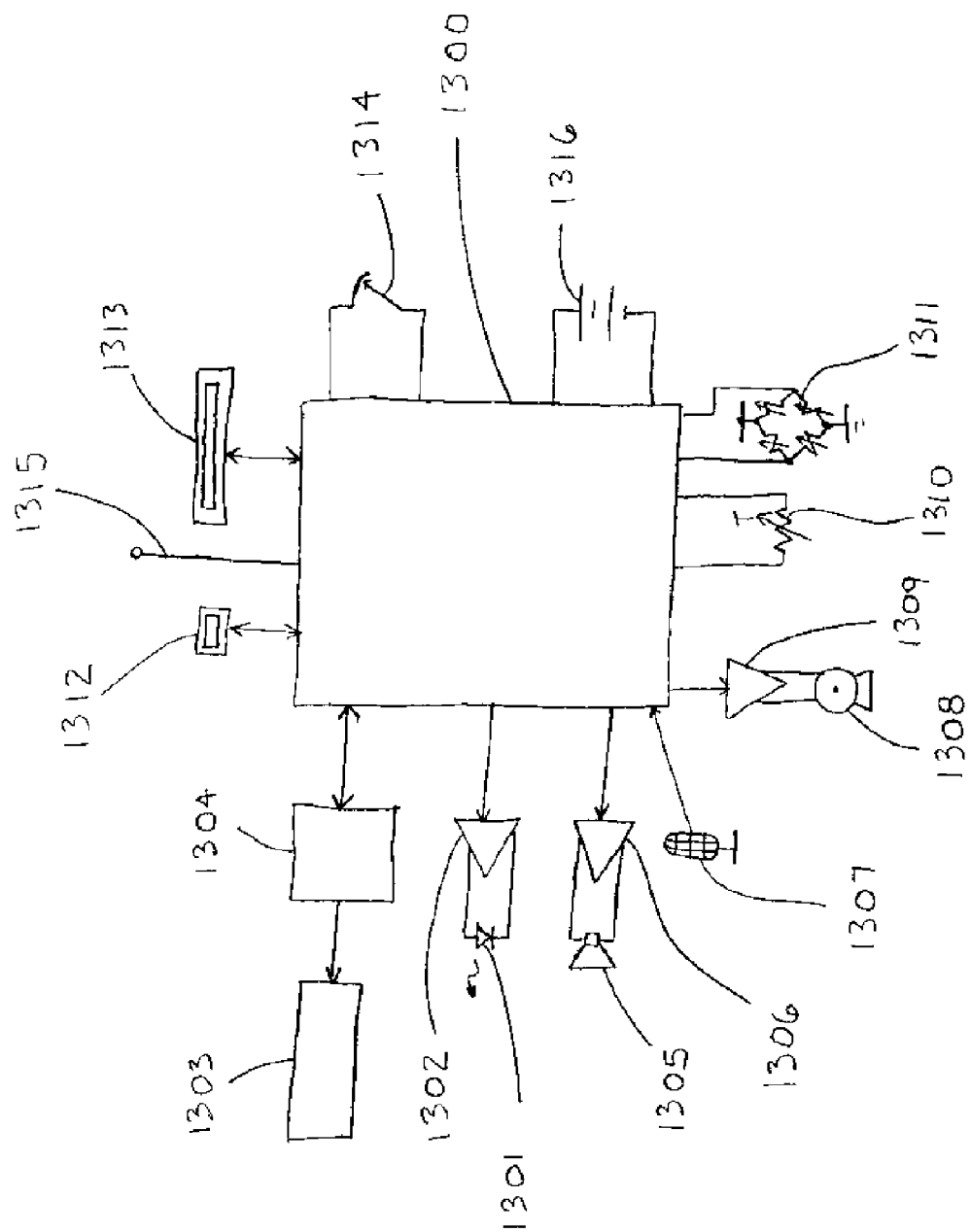
FIG. 13 is an electrical block diagram of a processor communicating with a variety of sensing and display devices of an active foodware item of the subject invention.

FIG. 13 is a block diagram of a processor 1300, such as a microprocessor, microcontroller, and the like, communicating with one or more sensing and display devices. Such devices include, but are not limited to visual indicators including LEDs 1301, which may have associated control hardware and software 1302, LCDs 1303, which may have associated control hardware and software 1304, plasma displays, electroluminescent light sources and fluorescent displays, CRTs, speakers 1305, including voice-coil and piezo-electric speakers, which may have associated control hardware and software 1306, microphones 1307, motors 1308 which may have associated control hardware and software 1309, force- and tactile-feedback displays, motion sensors, temperature sensors 1310, pressure sensors 1311, contact sensors, moisture sensors, humidity sensors, tilt sensors, wireless ports, USB communication ports 1312, serial ports, parallel ports, fire-wire ports, CD drives 1313, memory cards ports, on/off and other input switches 1314, antennae 1315, power sources 1316, and the like. Any of the sensing and display devices may have their own dedicated control hardware and software even though not explicitly shown in the figure.

Not all possible sensing and display devices according to the subject invention are shown in FIG. 13. Only a few exemplary sensing and display devices are depicted, and the details of the interconnections and interface hardware and software are obvious to those skilled in the art. There are a multitude of sensing and display technologies capable of providing the desired results, and not all such specific technologies are listed. For example, when a motor 1308 is listed, it may be an electrical motor, pneumatic motor, piezo-electric motor, hydraulic motor, or any other technology for producing a linear or angular displacement based on a control signal. When a temperature sensor is listed, it may be a thermistor, thermocouple, and the like, and any device for detecting temperature and converting it into a usable signal. When a power source is listed, it may be a battery, A/C adapter, transformer, or any other device for storing, converting or generating electrical power.

Figure 14:
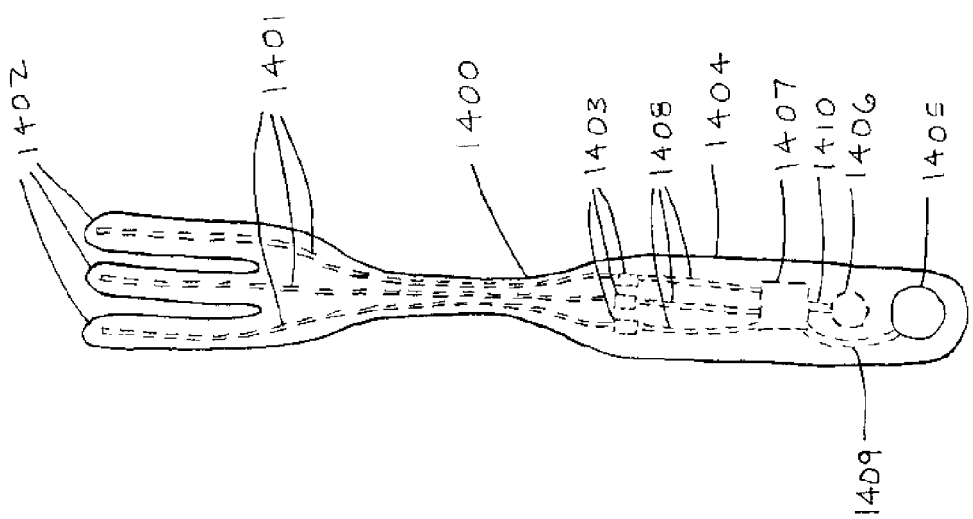
FIG. 14 is a plan view of an eating utensil (fork) with one or more active components, in this case, three light guides, an on/off switch, a battery and an electrical circuit.

FIG. 14 is a plan view of an eating utensil 1400 which includes active sensing and feedback. More specifically, the eating utensil is a fork, where light guides 1401 extend into the tines 1402 from LEDs 1403 positioned in the handle 1404. There is also an on/off switch 1405, power source 1406 and circuitry 1407 positioned in the handle 1404. The LEDs 1403 are connected to the circuitry 1407 via interconnections 1408, the switch 1405 is connected to the circuitry 1407 via interconnections 1409 and the power source 1406 is connected to the circuitry 1407 via interconnections 1410. The details of the circuitry 1407 are known to those skilled in the art. The switch 1405 may be any contact or proximity sensor, and the power source 1406 may be any device for supplying power, including but not limited to a battery.

Figures 15A, 15B, 15C, 15D:
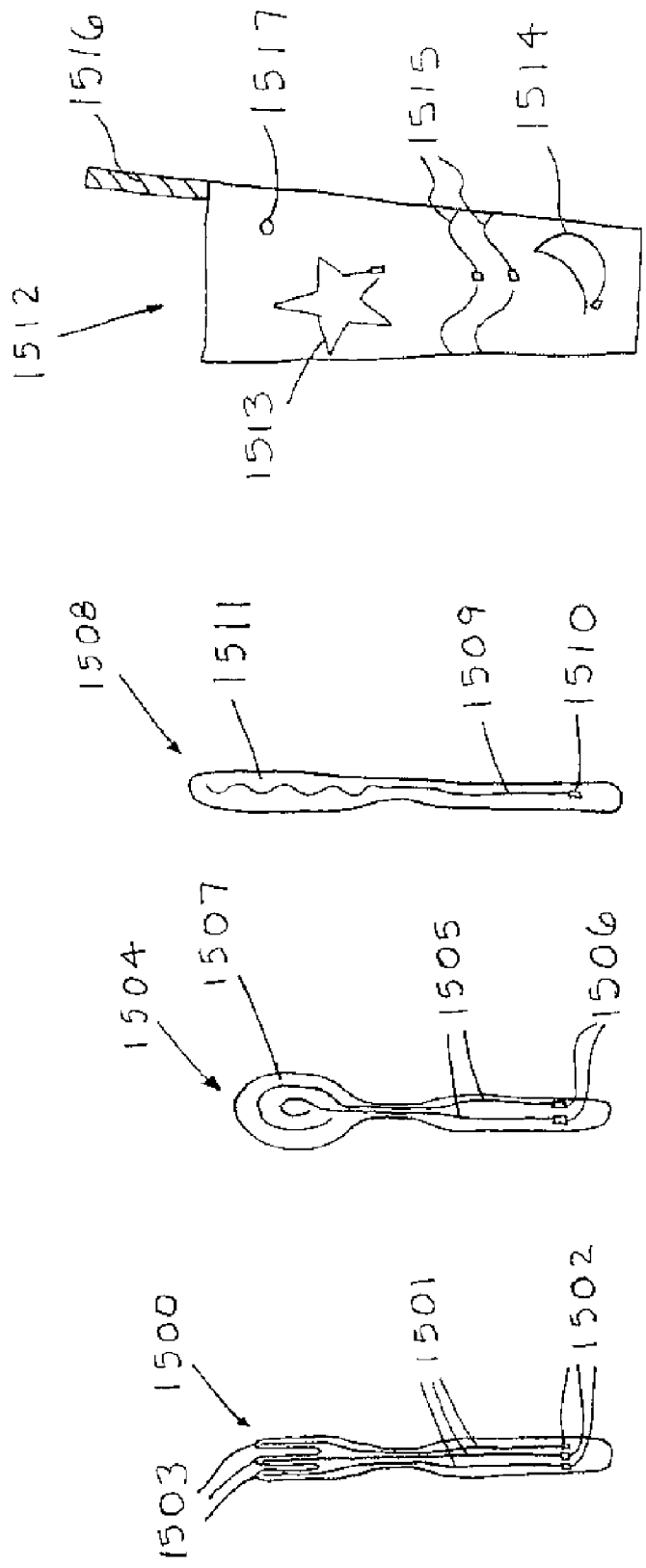
FIGS. 15A–15C are plan views of various foodware utensils with one or more active components.
FIG. 15D is a side view of a cup with one or more active components. No circuitry is shown for clarity.

FIGS. 15A–15C are plan views of three different examples of active eating utensils. In FIG. 15A, a fork 1500 has light guides 1501 emanating from light sources 1502 and where the light guides direct light emission for illuminating desired portions of the fork, such as each of three tines 1503. A power source, on/off switch, control electronics and interconnections are not shown for clarity and are known to those skilled in the art. Similarly, FIG. 15B is a spoon 1504 with light guides 1505 emanating from light sources 1506 and where the light guides direct light emission for illuminating desired portions of the spoon, such as a pattern in the end of the spoon 1507. Again, electrical details are omitted for clarity and are known to those skilled in the art. FIG. 15C is a knife 1508 with light guide 1509 emanating from a light source 1510 and where the light guide directs light emission for illuminating desired portions of the knife such as the blade 1511 of the knife. Again, electrical details are omitted for clarity and are known to those skilled in the art.

FIG. 15D is a drinking container 1512 with multiple active components. In this embodiment, four different light guide examples are shown, including a star 1513, a crescent moon 1514, a double wavy line 1515 and a spiral 1516. In this figure, the spiral 1516 is shown on an optional straw associated with the drinking container. Each light guide is associated with a light source and where each light guide directs light emission for illuminating desired portions of the container. The drinking container also shows an optional light source 1517 without light guide. The light source may be an LED. Again, electrical details are omitted for clarity and are known to those skilled in the art. In each of the FIGS. 15A–15D, the light sources may be energized in a desired temporal pattern and may be energized based on a signal from any of a variety of sensors (not shown) and including but not limited to a contact sensor, tilt sensor, moisture sensor, temperature sensor, auditory sensor, radio frequency sensor, electromagnetic sensor and optical sensor.

Figure 16B:
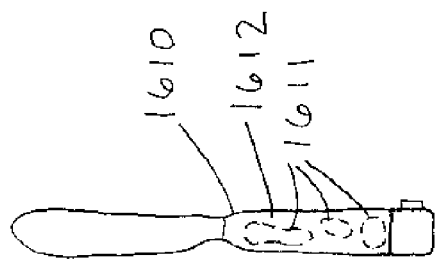
FIG. 16B is a side view of a utensil (knife) with one or more active components, such as oil in a non-oil-based liquid. Shown is an optional illuminating component in the base of the handle.
Figure 16A:
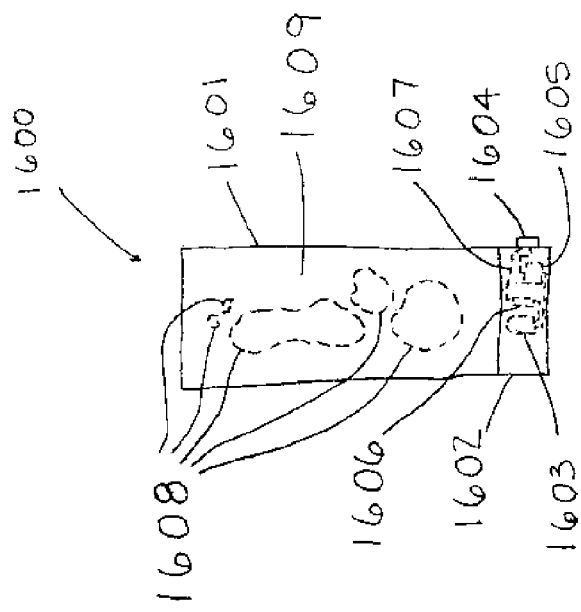
FIG. 16A is a side view of a cup with one or more active components. In this case, the active component is oil suspended in a non-oil-based liquid. Shown is an optional illuminating component in the base of the cup.
Figure 16C:
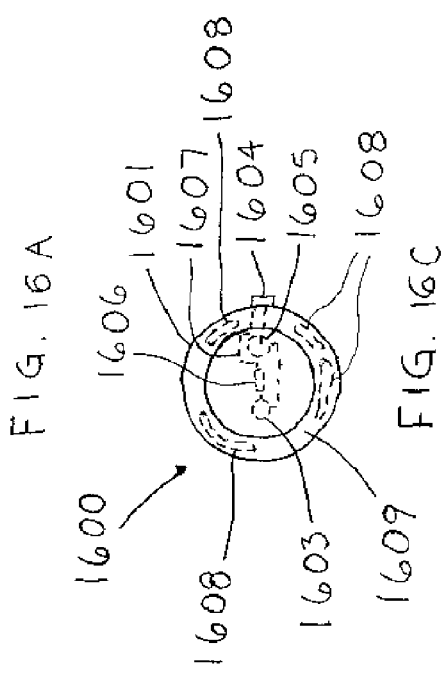
FIG. 16C is a plan view of the cup of FIG. 16A.

FIGS. 16A and 16C are a side view and plan view, respectively, of a drinking container 1600 with active components. In this embodiment, the container wall 1601 is filled with two liquids such as water with oil, where the specific gravity of the oil is greater than that of the water. In the base 1602 of the container are a lighting source 1603 and a heating source. In this embodiment, the lighting source is an incandescent light and also serves as the heating source. There may also be an on/off switch 1604, power source 1605, electrical control circuitry 1606 and interconnections 1607. In this embodiment, the electrical control circuitry is an electrical resistor and the power source is a battery. Such electronics may also be distributed throughout the container wall and need not be concentrated just in the base. The details of such electrical circuitry are known to those skilled in the art. Since oil and water don't mix, the oil will exist in amorphous shapes 1608 throughout the water 1609. Additionally, since the oil is heavier than water the oil shapes will sink to the bottom of the water near the base of the container. There the heating source will heat the oil, and surrounding water, causing the oil to rise to nearer the top of the container wall while the cooler oil shapes and the water nearer the top sink toward the bottom. Over time, some oil shapes will separate into multiple pieces, while other oil shapes will recombine. Additionally, due to the varying optical properties of the oil and water, the light source in the base will create interesting and entertaining optical patterns as the oil shapes move.

The specific type of oil and/or the particular properties of the water may be selected to provide desired physical and optical properties. For instance, different oils may exhibit desirable fluorescing properties; they may have different separating and recombining properties and may sink and rise at different rates.

FIG. 16B is an eating utensil comprising similar oil-water technology. In this embodiment, a knife handle 1610 has oil 1611 and water 1612 in it, and also comprises a lighting and heating source, along with the associated electronics, which are not shown in this embodiment and are known to those skilled in the art.

FIGS. 16A–16C are simple examples of foodware, such as a drinking container and an eating utensil, which may possess active components; however, the broad scope of the invention is not limited to these two foodware examples.

Active foodware may also comprise electrostatic technology. For example, the foodware may be partially hollow and filled with a gas containing ions and an energized electrode such that where the user/diner contacts the external surface of the foodware an electrical arc will occur, looking like a miniature lightening bolt from the electrode to the point of user/diner contact. Such technology is known to those skilled in the art and the details are not presented explicitly in this patent but are incorporated herein by reference.

Active foodware is desirable in many applications, including entertainment and promotion at home and in a restaurant. For example, fast food chains may provide active foodware as promotional items. Foodware with lighting sources will make it fun to eat in an otherwise dark environment. Lighting sources may include black lights and oils may include associated fluorescents matched to the black lights.

FIG. 17A is a frontal view of a liquid container 1700 with an active component. In this particular embodiment a beer bottle has a label 1701 with light guide 1702, light source 1703, function switch 1704 and electrical circuitry 1705 which contains an electrical power source. As is the case with other light guides, the light guide guides light from the light source to one or more locations where the light is emitted for the user/diner to see. The light may be emitted over the entire length of the light guide, over a portion of the light guide and/or at one or more discrete points. In the embodiment of FIG. 17A an indicia of label 1701, such as the name of a beer, is illuminated, producing a similar visual effect to a miniature neon street sign. Light sources producing different colors may be used.

FIG. 17B is a cutaway top view of FIG. 17A showing the light guide 1702 and associated components affixed to the label 1701 which is affixed to the front of the liquid container.

FIG. 17C is a cutaway view similar to FIG. 17B, but where the lighting source 1706 and light guide 1707 are positioned inside the wall 1708 of the liquid container. The light from the lighting source may be guided in a variety of manners, including via a light fiber, electroluminescent light source, a light tube, a light channel which may contain air, gas, or another fluid, which may fluoresce, and the like. The associated electronics are not shown but are known to those skilled in the art.

Figure 17E:
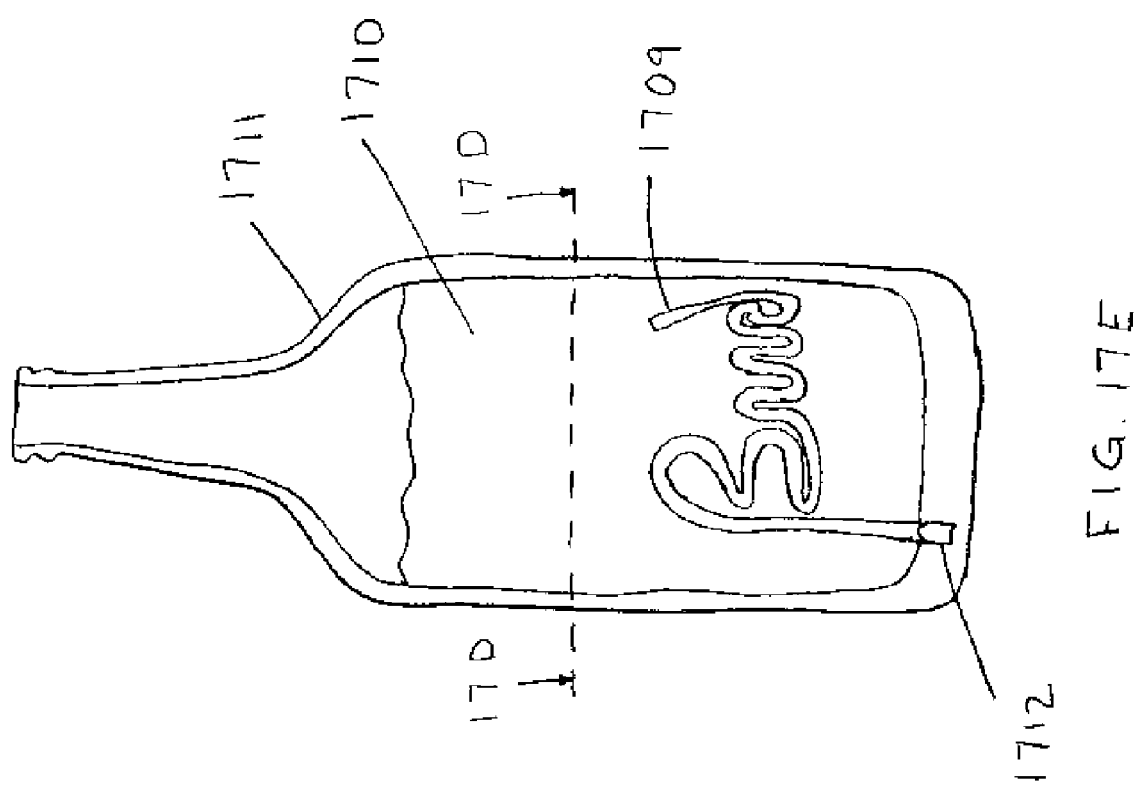
FIG. 17E is a cross-sectional side view of the container of FIG. 17D with one or more active components inside the container. A light fiber is shown.

FIG. 17D is a cutaway view of FIG. 17E where at least a portion of the light guide 1709 is located inside the liquid 1710 of the liquid container 1711. The light from the lighting source 1712 may be guided in a variety of manners, including via a light fiber, a light tube, and the like. With such a location, the light guide 1709 can illuminate the liquid 1710 being contained. The light source 1712 may be located in a variety of convenient places, including inside the wall of the container, in the liquid inside the container, or in any location where light from the light source can enter the light guide. The associated electronics are not shown but are known to those skilled in the art.

FIG. 17E is a side cross-section view of the liquid container 1711 of FIG. 17D, where at least a portion of the light guide 1709 is positioned inside the liquid 1710 in the liquid container. The associated electronics are not shown but are known to those skilled in the art.

FIG. 18A is a frontal view of a liquid container 1800 with an active label. The label 1801 may include a variety of display elements such as pictures or the segments of a 7-segment display 1802. The active elements of the label may include LCD or LED technology. The label may have a function switch 1803 which may be used to turn on/off the display and select the desired images to display. The associated electronics, including the power source, are not shown for clarity but are known to those skilled in the art.

FIG. 18B is a frontal view of a liquid container 1804 with a label with a matrix of individually controllable picture elements (pixels) capable of producing a large number of desirable images. The label 1805 may be a separate component associated with the liquid container or the label may be a region of the container itself comprising one or more active components. Similar to a television screen, the pixels may produce text 1806 or other images 1807 which may appear to move given appropriate pixel sequencing. The label of this specific embodiment also comprises an auditory output device 1808. Such an auditory output device may be a piezo-electric speaker, voice-coil speaker, or any other suitable device for producing sound. The label as shown also comprises a function switch 1809; although, multiple function switches may be used. The function switch may turn on/off the visual display, may turn on/off the auditory output and may select from one or more visual or auditory displays.

FIG. 18C is an electrical block diagram comprising a processor 1810, function switch 1811, power source 1812, audio amplifier 1813, audio output device 1814 and visual display with driver 1815. The electrical block diagram also includes one or more optional sensors 1816 and optional wireless communication capabilities 1817. The label may also include a microphone (not shown) to detect spoken user/diner input. Sensors include, but are not limited to, contact sensors, motion sensors, temperature sensors, positions sensors, humidity sensors, light sensors, auditory sensors, liquid level sensors, sensors to detect whether the container is open, and the like. Details of the electrical block diagram and how to physically implement it are known to those skilled in the art.

With the embodiment of FIG. 18B a user/diner may see and/or hear moving advertisements on the label. Advertisements may be associated with signals from one or more sensors. A vendor can send updated advertisements that may be associated with signals from one or more sensors. For example, if a sensor is a global positioning system (GPS), a liquid container vendor may send an advertisement specific to the user/diner's city or restaurant. A restaurant may send an advertisement to a user/diner inside their restaurant, and the user/diner may respond by activating a function switch on the liquid container or by speaking into the microphone. Using sensors, information may be collected about the user/diner.

Many of the embodiments depicted thus far have included a liquid container but are meant to exemplify how active components may be associated with a broad class of foodware and not limited to liquid containers.

FIG. 19A is a side cross-sectional view of an active plate 1900 comprising a stationary dining surface 1901 and a movable inner portion 1902. In this embodiment, the movable inner portion is a rotating disk being rotated by a flat "pancake" motor 1903. A plan view of the rotating disk is shown in FIG. 19B. The stationary dining surface may comprise one or more active elements, including but not limited to LEDs 1904 and light guides. The stationary dining surface may also comprise a portion 1905 which is translucent such that light coming from the movable inner portion can be seen by the user/diner. The dining surface may have one or more elements for diffusing or transmitting light coming from the movable inner portion. Such elements may include light guides 1906, components 1907 with different shapes and indices of refraction, and the like. The movable inner portion 1902 may comprise one or more active components, including but not limited to light sources such as LEDs 1908, light guides with associated light sources 1909, LED or LCD panels 1910, reflective surfaces 1911, and the like. Text and images may be displayed and may provide advertisements. Kaleidoscopic images may be produced. Details of the electrical circuitry have been omitted for clarity but are known to those skilled in the art. As with other embodiments, the active technologies shown in the embodiment here with an eating plate may also be applied to other foodware, including cups, utensils and the like.

FIG. 20A is a side cross-section view of a stationary dining surface 2000 with a first movable inner portion 2001. Although the active sensing and feedback features are not redrawn in FIG. 20A for clarity, the stationary dining surface 2000 and first movable inner portion 2001 of the embodiment of FIG. 20A may have similar active sensing and feedback features to the stationary dining surface 1901 and movable inner portion 1902, respectively, of FIGS. 19A and 19B; however, rather than the first movable inner portion 2001 being directly moved by a motor, the first movable inner portion 2001 of the embodiment of FIG. 20A is magnetically coupled via magnets to a second movable portion 2002 which is moved by a motor 2003 and which may be positioned below the first movable portion 2001. There are various ways to magnetically couple the first movable portion with the second movable portion such that movement of the second movable portion causes the first movable portion to move. For example, the second movable portion may have magnets 2004, which may be permanent magnets or electromagnets, which are positioned in functional relation to iron-based objects 2005 in the first movable portion, such that the magnetic fields 2006 provided by the magnets of the second movable portion pass through the stationary dining surface 2000 and provide a magnetic attraction to the iron-based objects 2005 in the first movable portion 2001. Accordingly, as the first movable portion moves, the second movable portion similarly moves. Alternatively, the first movable portion may comprise magnets, either permanent magnets or electromagnets, which magnetically couple to iron-based objects in the motorized second movable portion.

FIGS. 21A–21D are plan views of an embodiment of an active plate 2100 where a refreshable moving image, depicted as a spider 2101, may be viewed by the user/diner. The image may be generated by a variety of means including an LCD screen in functional relation to the plate. For instance, the LCD screen may be affixed to the plate, or it may be positioned beneath the top surface and viewed through optics in the plate. The plate may comprise optics, including but not limited to optics which enlarge the image, decrease the size of the image, distort the image, redirect all or a portion of the image or allow the image to be viewed unchanged. FIGS. 21A–21D show images of a moving spider at different times. In FIG. 21A, the spider 2101 is at the top of the active plate 2100; in FIG. 21B, the spider 2101 has crawled counterclockwise around the perimeter of the active plate 2100; in FIG. 21C, the spider 2101 has crawled even further counterclockwise; and in FIG. 21D, the spider 2101 has descended down a web 2102.

Figure 22:
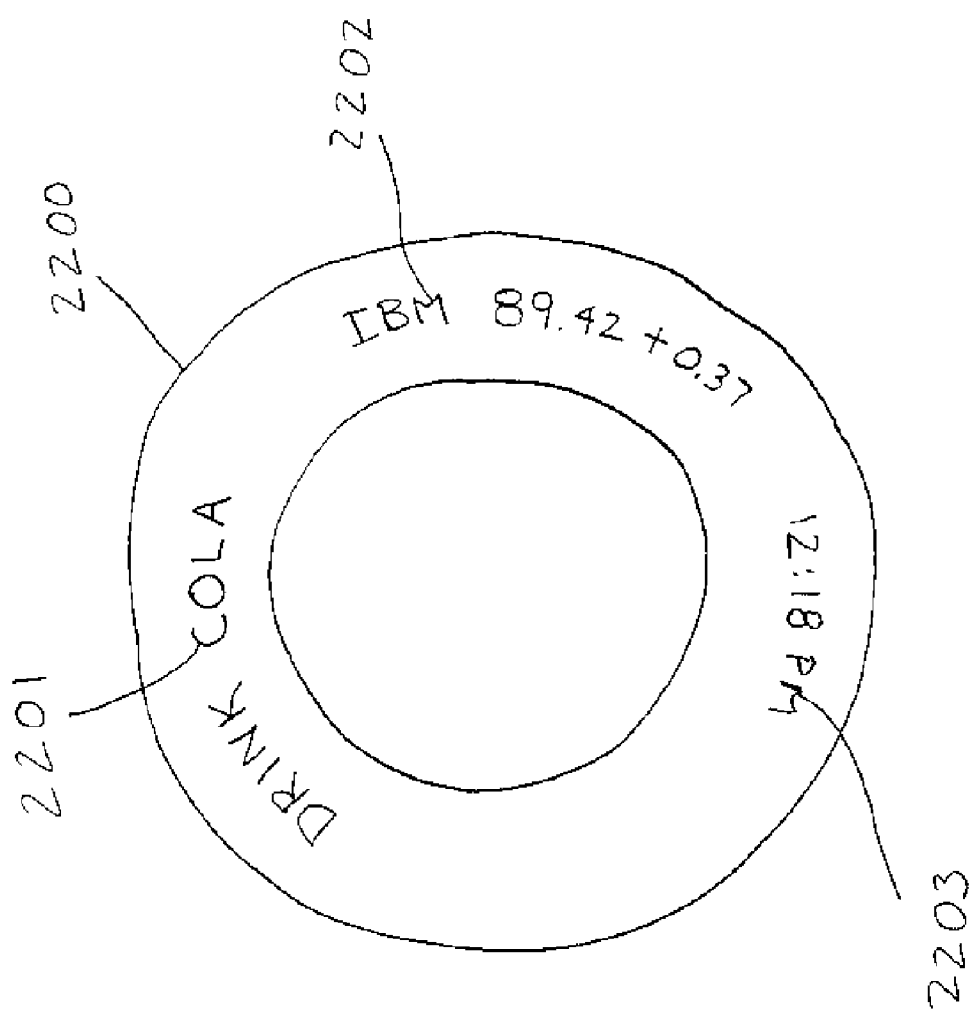
FIG. 22 is a plan view of an active eating plate where information is displayed and updated around the perimeter.

FIG. 22 is a plan view of an active plate 2200 where information is displayed. In this embodiment, the information is displayed around the periphery of the plate; although, it could be displayed at any convenient location on the plate. The information may include, but is not limited to, text, graphics, images, advertisements 2201, news flashes, stock quotes 2202, time 2203, temperature, weather, sports scores, song information which may be accompanied by music coming from a speaker associated with the plate, appointment notification, a phone number, a greeting, and the like. The information that is displayed on the active foodware plate may be pre-programmed into memory associated with the plate, it may be received in real time and/or it may be provided to the plate via wired means, wireless means, external media, and the like.

Figure 23A:
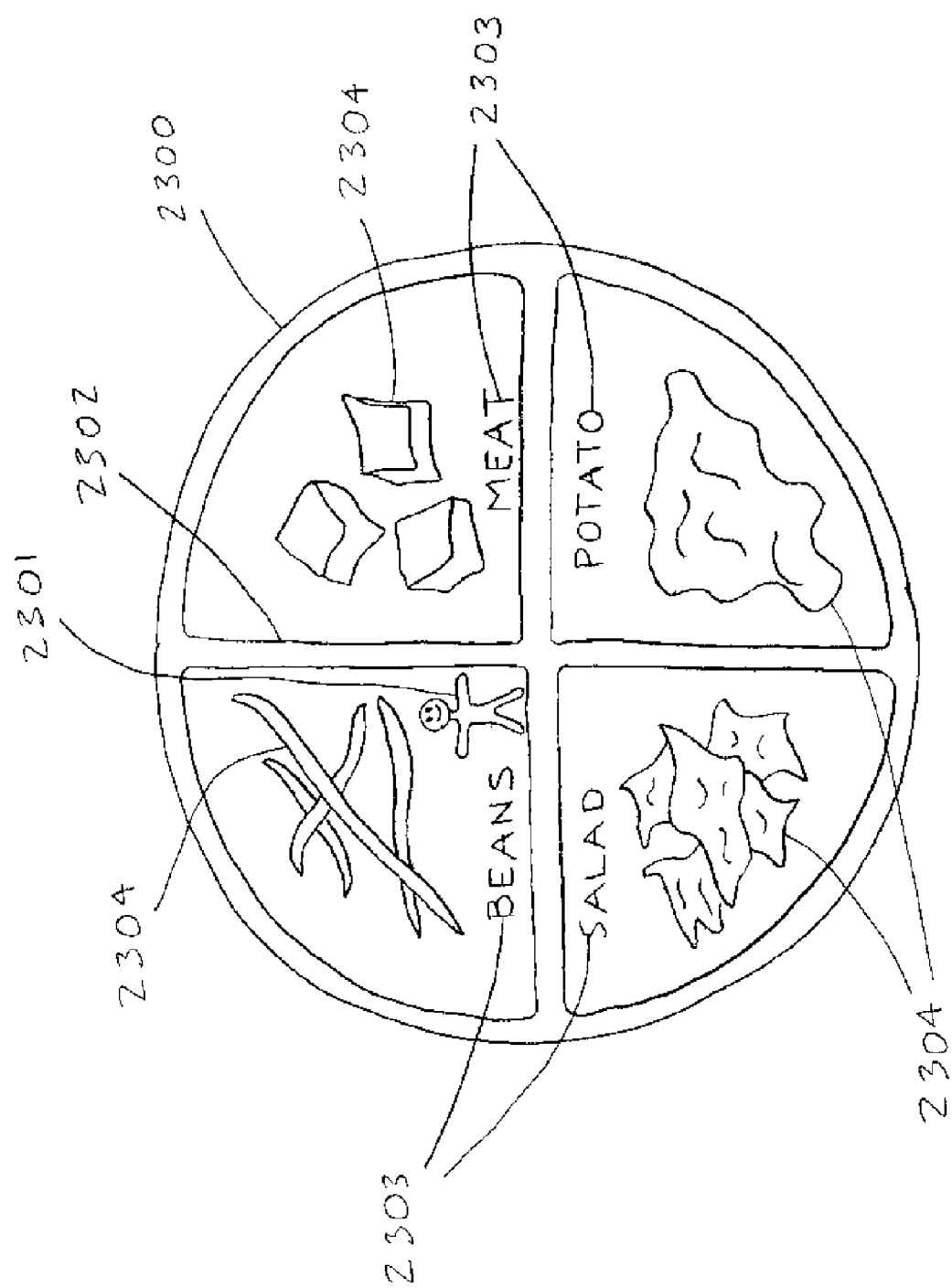
FIG. 23A is a plan view of an eating plate with multiple compartments and one or more active components. In this case, the compartments include LCD panels where a small figure may be displayed to encourage the user/diner.

FIG. 23A is a plan view of an active foodware plate 2300. This embodiment has a movable character 2301 for communicating with the user/diner. The plate also comprises optional boundaries 2302 and partition labels 2303 associated with the contents 2304 of the partitions. The boundaries may be physical or visually displayed boarders. The character may be used to communicate with the user/diner, for example a child, where the character entertains, encourages and/or coaches, and the like, the user/diner while eating. The character may be animated, recorded video and the like. Visual, auditory and haptic feedback may be associated with the character. In one scenario, the character may use auditory feedback to tell a young user/diner how good beans taste and that all his friends finish their beans, so the young user/diner is encouraged to eat a food they might otherwise not.

FIG. 23B is a plan view of a computing device 2305 which is able to communicate with the active foodware plate 2300, or in general, with any active foodware component. In this embodiment, the computing device is handheld and has a touch screen 2306, including a graphical display, with optional stylus 2307 and keyboard 2308. The computing device may communicate with the active foodware plate wirelessly or via wires. The details of such wired and/or wireless communication is known by those skilled in the art. One application is that a parent may use the computing device to communicate with a child user/diner via their active foodware plate. For example, using an optional stylus 2307, the parent may touch a part of touch screen 2306 on the computing device corresponding to a particular location or food on the child's active foodware plate and which may invoke a desired response from the moveable character 2301 or may invoke some other feedback to the child. For example, the parent may touch a partition 2309 on their touch screen labeled "BEANS," causing the character animated on the plate to appear to jump over the partition on the plate from the "MEAT" to the "BEANS," and using auditory or visual feedback ask the child if they would please eat some beans. The plate may have contact or proximity sensing (not shown, but known to those skilled in the art) capable of detecting that the child is using a utensil in proximity to the beans such that the character then gives positively reinforcing feedback to the child. There may be a wide variety of commands the parent can invoke from the computing device that produce desired feedback to the child user/diner via their active foodware.

Figure 24A:
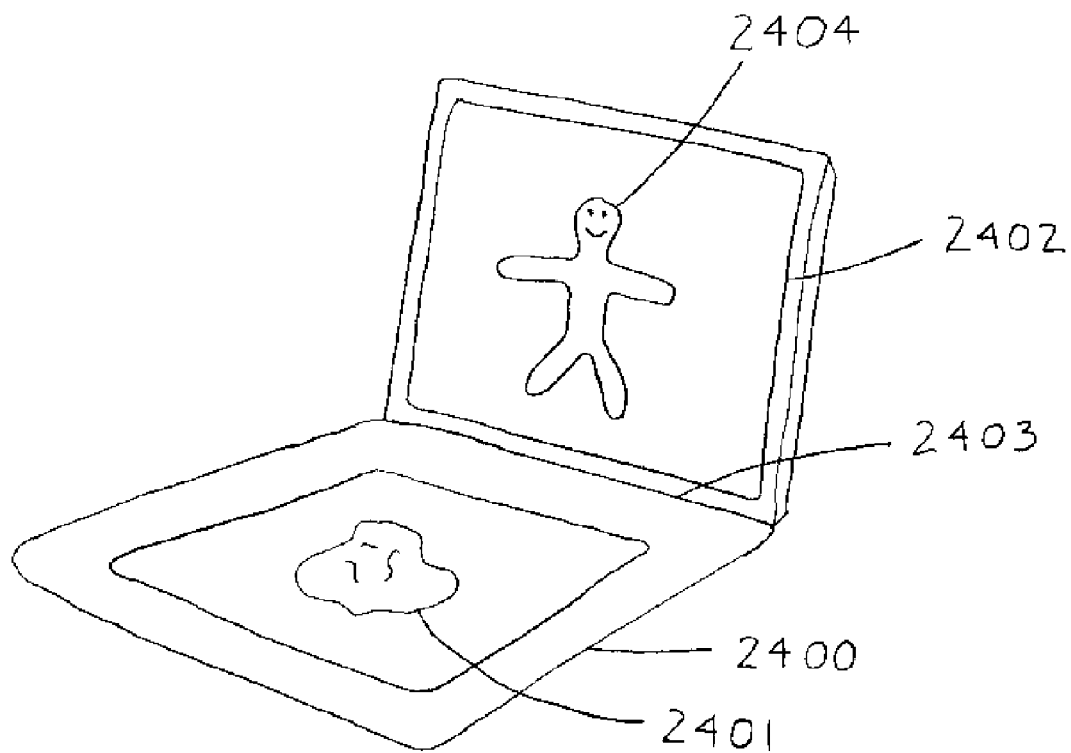
FIG. 24A is a perspective view of an eating plate with a visual sensory stimulating component positioned in functional relation.

FIG. 24A is a perspective view of an eating plate 2400 with food 2401 on it and with a visual display 2402, such as an LCD or plasma display in close functional relationship to the plate. In this embodiment, the visual display 2402 is attached to the eating plate 2400 such that there is at least a portion of the visual display 2402 which is not intended to be covered by food 2401. The visual display 2402 may be flexibly attached to the eating plate 2400 with flexible means 2403 such that the angle of the visual display may be changed by the user/diner. Such optional flexible means includes, but is not limited to two-piece hinges with a mating pin, living hinges, and the like. The visual display 2402 may be able to be tilted all the way back so it lies in the same plane as the eating plate 2400. The visual display 2402 may also be able to be tilted all the way forward so it covers the eating plate 2400. The control and communication circuitry of the visual display is known to those of ordinary skill in the art and may be located at any convenient location, including behind the visual display screen or under the plate. The circuitry is not shown here for clarity. One advantage of this embodiment is that information 2404 of the visual display 2402 will not be obscured by food 2401, yet the visual display 2402 is still closely associated with the eating plate 2400. Auditory sensory stimulating components, sensing components and/or haptic components may also be associated with the plate of this embodiment.

Figure 24B:
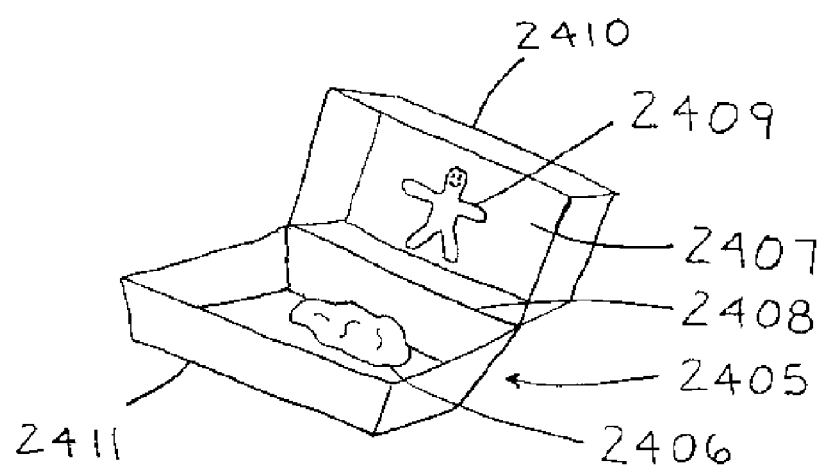
FIG. 24B is a perspective view of a food container with visual sensory stimulating component positioned in functional relation.

FIG. 24B is a perspective view of a food container 2405 with food 2406 in it and with a visual display 2407, such as an LCD or plasma display in close functional relationship to the container. In this embodiment, the visual display 2407 is associated with the lid 2410 of the food container such that there is at least a portion of the visual display 2407 which is not intended to be covered by the food 2406. The visual display 2407 may be affixed to the lid 2410 of the food container, which may be flexibly attached to the bottom portion 2411 of the food container with flexible means 2408 such that the angle of the visual display may be changed by the user/diner. Such optional flexible means 2408 includes, but is not limited to two-piece hinges with a mating pin, living hinges, and the like. The food container lid with associated visual display may be able to be tilted all the way back so the visual display lies in the same plane as the bottom surface of the bottom portion of the food container. The food container lid with associated visual display may also be able to be tilted all the way forward so the lid covers the bottom portion of the food container. The control and communication circuitry of the visual display is known to those of ordinary skill in the art and may be located at any convenient location on or about the food container, including in the lid behind the associated visual display screen or under the bottom portion of the food container. The circuitry is not shown here for clarity. One advantage of this embodiment is that information 2409 of the visual display 2407 will not be obscured by food 2406, yet the visual display 2407 is still closely associated with the food container 2405. A typical use for this embodiment is found with fast food restaurants, such as where children's meals, chicken pieces and the like are distributed. Auditory sensory stimulating components, sensing components and/or haptic components may also be associated with the food container of this embodiment.

It is evident from the above description that a new way of using foodware, particularly dinnerware, is provided. Instead of static dinnerware that while being attractive is passive, the subject dinnerware is active providing for numerous stimuli for a variety of purposes. The dinnerware can be used to encourage young users or diners to eat their food, learn while eating, be responsive to requests and commands, be entertained, monitored, and communicate by means of the dinnerware. Adults may use the dinnerware to communicate with others, watch events, review activities, and the like. The subject foodware provides an entirely new paradigm in the use of common foodware and makes the foodware highly versatile in its applications.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A dining unit comprising:
   a dining plate and optionally an underplate;
   a power source;
   said dining plate or said underplate comprising at least one light source selected from the group consisting of light emitting diodes (LEDs) having light guides, optical wave guides, electroluminescent light sources, liquid crystal display (LCD) panels, fluorescent displays, plasma displays, incandescent lights having light guides, fluorescent lights and fluorescent materials; and light from said at least one light source forming an image.

2. A dining unit according to claim 1, said dining plate or said underplate further comprising at least one from the group consisting of a sensing component, an auditory sensory stimulating component, a haptic feedback component, a processor, a hollow containing a liquid or gas, a moveable inner portion or a data adaptor.

3. A dining unit according to claim 1 wherein at least a portion of said dining plate is translucent, said dining plate containing said power source and said at least one light source, wherein light from said at least one light source emanates from said translucent portion of said dining plate.

4. A dining unit according to claim 1 further comprising a utensil including a power source and a light source.

5. A dining unit according to claim 1 further comprising a liquid container including a power source and a light source.

6. A dining unit according to claim 1 comprising an underplate, wherein at least a portion of said dining plate is translucent, said underplate containing said power source and said at least one light source, wherein light from said at least one light source emanates through said translucent portion of said dining plate.

7. A dining unit according to claim 1, said dining plate or said underplate further comprising an upper layer and a lower layer with said at least one light source between said layers, said layers bonded together to provide a water resistant seal.

8. A dining unit according to claim 1 further comprising a programmable device.

9. A dining unit according to claim 1 comprising an underplate including said power source and supporting said dining plate, wherein at least a portion of said dining plate is a translucent, wherein light from said at least one light source emanates from said translucent portion of said dining plate.

10. A dining unit according to claim 1 comprising an underplate, wherein said light initiates from said underplate.

11. A dining unit according to claim 1 wherein said at least one light source defines a figure.

12. A dining unit according to claim 11 wherein said figure is a variable figure.

13. A dining unit according to claim 1 comprising an underplate, wherein said at least one light source is contained in said dining plate and said underplate activates said at least one light source.

14. A dining unit according to claim 13 wherein said at least one light source is an electroluminescent light source.

15. A dining unit comprising:
a dining plate and optionally an underplate;
a power source;
at least one light source selected from the group consisting of liquid crystal display (LCD) panels, fluorescent displays and plasma displays contained by one of said dining plate and said underplate;
a controller for receiving power from said power source and selectively energizing said at least one light source for enhancing a dining experience; and
light from said at least one light source forming an image.

16. A dining unit comprising:
a dining plate and optionally an underplate;
a power source;
a liquid crystal display (LCD) panel contained by one of said dining plate and said underplate;
a controller for receiving power from said power source and selectively energizing said LCD panel for enhancing a dining experience; and
light from said LCD panel forming an image.

17. A dining unit comprising:
a dining plate and optionally an underplate;
a power source;
an electroluminescent light source contained by one of said dining plate and said underplate;
a controller for receiving power from said power source and selectively energizing said electroluminescent light source for enhancing a dining experience; and
light from said electroluminescent light source forming an image.

18. A dining unit comprising:
a dining plate and optionally an underplate;
a power source;
at least one light source selected from the group consisting of light emitting diodes (LEDs), optical wave guides, electroluminescent light sources, liquid crystal display (LCD) panels, fluorescent displays, plasma displays, incandescent lights, fluorescent lights and fluorescent materials;
a controller for receiving power from said power source and selectively energizing said at least one light source for enhancing a dining experience, said controller comprising a processor under the surface of said dining plate; and
light from said at least one light source forming an image.

19. A dining unit comprising:
a dining plate portion including a rim and a recessed center portion for receiving food;
a substantially vertically arranged portion including a liquid crystal display;
a power source;
a controller for receiving power from said power source and selectively energizing said liquid crystal display; and
light from said liquid crystal display forming an image for enhancing a dining experience.

20. A dining unit comprising:
a dining plate portion including a rim and a recessed center portion for receiving food;
a display portion including a liquid crystal display, said display portion hinged to said dining plate portion for changing the angle of said display portion in relation to said dining plate portion;
a power source;
a controller for receiving power from said power source and selectively energizing said liquid crystal display; and
light from said liquid crystal display forming an image for enhancing a dining experience.

21. A dining unit according to claim 15, said dining plate or said underplate further comprising at least one from the group consisting of a sensing component, an auditory sensory stimulating component, a haptic feedback component, a processor, a hollow containing a liquid or gas, a moveable inner portion or a data adaptor.

22. A dining unit according to claim 15 further comprising at least one from the group consisting of (1) a utensil including a power source and a light source and (2) a liquid container including a power source and a light source.

23. A dining unit according to claim 15, said dining plate or said underplate further comprising an upper layer and a lower layer with said at least one light source between said layers, said layers bonded together to provide a water resistant seal.

24. A dining unit according to claim 15 further comprising a programmable device.

25. A dining unit according to claim 15 comprising an underplate including said power source and supporting said dining plate.

26. A dining unit according to claim 15 comprising an underplate, wherein said at least one light source is contained in said dining plate and said underplate activates said at least one light source.

27. A dining unit according to claim 26 wherein said at least one light source is an LCD panel.

28. A dining unit according to claim 16, said dining plate or said underplate further comprising at least one from the group consisting of a sensing component, an auditory sensory stimulating component, a haptic feedback component, a processor, a hollow containing a liquid or gas, a moveable inner portion or a data adaptor.

29. A dining unit according to claim 16 further comprising at least one from the group consisting of (1) a utensil including a power source and a light source and (2) a liquid container including a power source and a light source.

30. A dining unit according to claim 16, said dining plate or said underplate further comprising an upper layer and a lower layer with said LCD panel between said layers, said layers bonded together to provide a water resistant seal.

31. A dining unit according to claim 30 comprising an underplate, wherein said light initiates from said underplate.

32. A dining unit according to claim 17, said dining plate or said underplate further comprising at least one from the group consisting of a sensing component, an auditory sensory stimulating component, a haptic feedback component, a processor, a hollow containing a liquid or gas, a moveable inner portion or a data adaptor.

33. A dining unit according to claim 17 further comprising at least one from the group consisting of (1) a utensil including a power source and a light source and (2) a liquid container including a power source and a light source.

34. A dining unit according to claim 17, said dining plate or said underplate further comprising an upper layer and a lower layer with said electroluminescent light source between said layers, said layers bonded together to provide a water resistant seal.

35. A dining unit according to claim 17 further comprising a programmable device.

36. A dining unit according to claim 17 wherein said electroluminescent light source defines a figure.

37. A dining unit according to claim 17 comprising an underplate including said power source and supporting said dining plate.

38. A dining unit according to claim 17 comprising an underplate, wherein said electroluminescent light source is contained in said dining plate and said underplate activates said electroluminescent light source.

39. A dining unit according to claim 18, said dining plate or said underplate further comprising at least one from the group consisting of a sensing component, an auditory sensory stimulating component, a haptic feedback component, a processor, a hollow containing a liquid or gas, a moveable inner portion or a data adaptor.

40. A dining unit according to claim 18 further comprising at least one from the group consisting of (1) a utensil including a power source and a light source and (2) a liquid container including a power source and a light source.

41. A dining unit according to claim 18, said dining plate or said underplate further comprising an upper layer and a lower layer with said at least one light source between said layers, said layers bonded together to provide a water resistant seal.

42. A dining unit according to claim 18 wherein said at least one light source defines a figure.

43. A dining unit according to claim 18 comprising an underplate including said power source and supporting said dining plate.

44. A dining unit according to claim 18 comprising an underplate, wherein said at least one light source is contained in said dining plate and said underplate activates said at least one light source.

45. A dining unit according to claim 44 wherein said at least one light source is an electroluminescent light source.

46. A dining unit according to claim 19, said dining plate portion or said substantially vertically arranged portion further including at least one from the group consisting of a sensing component, an auditory sensory stimulating component, a haptic feedback component, a processor, a hollow containing a liquid or gas, a moveable inner portion or a data adaptor.

47. A dining unit according to claim 19 further comprising at least one from the group consisting of (1) a utensil including a power source and a light source and (2) a liquid container including a power source and a light source.

48. A dining unit according to claim 19 further comprising a programmable device.

49. A dining unit according to claim 20, said dining plate portion or said display portion further including at least one from the group consisting of a sensing component, an auditory sensory stimulating component, a haptic feedback component, a processor, a hollow containing a liquid or gas, a moveable inner portion or a data adaptor.

50. A dining unit according to claim 20 further comprising at least one from the group consisting of (1) a utensil including a power source and a light source and (2) a liquid container including a power source and a light source.

51. A dining unit according to claim 20 further comprising a programmable device.

* * * * *